United States Patent
Taras et al.

(10) Patent No.: US 11,435,095 B2
(45) Date of Patent: Sep. 6, 2022

(54) HYBRID HEAT PUMP WITH IMPROVED DEHUMIDIFICATION

(71) Applicant: Climate Master, Inc., Oklahoma City, OK (US)

(72) Inventors: Michael F. Taras, Oklahoma City, OK (US); Michael S. Privett, Tuttle, OK (US)

(73) Assignee: Climate Master, Inc., Oklahoma City, OK (US)

( * ) Notice: Subject to any disclaimer, the term of this patent is extended or adjusted under 35 U.S.C. 154(b) by 0 days.

(21) Appl. No.: 17/121,157

(22) Filed: Dec. 14, 2020

(65) Prior Publication Data

US 2021/0095872 A1 Apr. 1, 2021

Related U.S. Application Data

(63) Continuation of application No. 15/725,148, filed on Oct. 4, 2017, now Pat. No. 10,866,002.
(Continued)

(51) Int. Cl.
*F24F 5/00* (2006.01)
*F25B 30/02* (2006.01)
(Continued)

(52) U.S. Cl.
CPC .............. *F24F 5/00* (2013.01); *F25B 13/00* (2013.01); *F25B 30/02* (2013.01); *F25B 49/02* (2013.01);
(Continued)

(58) Field of Classification Search
CPC .......... F25B 13/00; F25B 30/02; F25B 49/02; F25B 2313/004; F25B 2400/0403;
(Continued)

(56) References Cited

U.S. PATENT DOCUMENTS 3,460,353 A  8/1969 Ogata et al.
3,916,638 A  11/1975 Schmidt
(Continued)

FOREIGN PATENT DOCUMENTS

CA  1178268  11/1984
CN  1987397 A  6/2007
(Continued)

OTHER PUBLICATIONS

"134-XS and 134-S Series Compressors ECOnomizer (EA-12-03-E)," 134-XS and 134-S series—Application and Maintenance Manual, Technical report EA1203E, RefComp Refrigerant Compressors, undated but believed to be publicly available at least as early as Mar. 2014 (4 pages).
(Continued)

*Primary Examiner* — Joseph F Trpisovsky
(74) *Attorney, Agent, or Firm* — Neal, Gerber & Eisenberg LLP; Thomas E. Williams

(57) ABSTRACT

A hybrid heat pump system comprising a heat pump loop integrated with a hydronic loop. The hybrid heat pump system offers multiple modes of operation to provide increased versatility and improved performance. Each of the loops can operate independently. In addition, the loops can operate in conjunction with each other in both heating and cooling modes. Still further, the hydronic loop can provide a reheat function when the heat pump loop is operating in the cooling mode to provide improved dehumidification of the air delivered to the conditioned space. The heat pump loop may include a hot gas bypass functionality for capacity control and/or freeze protection. The hydronic heat exchanger and the space heat exchanger of the heat pump loop may be combined in a compact single slab construction with a slit fin preventing cross-conduction between the heat exchanger sections.

11 Claims, 25 Drawing Sheets

Related U.S. Application Data

(60) Provisional application No. 62/419,526, filed on Nov. 9, 2016.

(51) Int. Cl.
*F28C 1/00* (2006.01)
*F25B 49/02* (2006.01)
*F25B 13/00* (2006.01)

(52) U.S. Cl.
CPC .......... *F28C 1/00* (2013.01); *F25B 2313/004* (2013.01); *F25B 2400/0403* (2013.01); *F25B 2600/13* (2013.01); *F25B 2600/2501* (2013.01); *F25B 2600/2513* (2013.01); *Y02B 30/70* (2013.01)

(58) Field of Classification Search
CPC .......... F25B 2600/13; F25B 2600/2501; F25B 2600/2513; F24F 5/00; F28C 1/00
See application file for complete search history.

(56) References Cited

U.S. PATENT DOCUMENTS

| | | |
|---|---|---|
| 3,938,352 A | 2/1976 | Schmidt |
| 4,072,187 A | 2/1978 | Lodge |
| 4,173,865 A | 11/1979 | Sawyer |
| 4,179,894 A | 12/1979 | Hughes |
| 4,299,098 A | 11/1981 | Derosier |
| 4,399,664 A | 8/1983 | Derosier |
| 4,441,901 A | 4/1984 | Endoh |
| 4,493,193 A | 1/1985 | Fisher |
| 4,528,822 A | 7/1985 | Glamm |
| 4,538,418 A | 9/1985 | Lawrence et al. |
| 4,575,001 A | 3/1986 | Oskarsson et al. |
| 4,592,206 A | 6/1986 | Yamazaki et al. |
| 4,598,557 A | 7/1986 | Robinson et al. |
| 4,645,908 A | 2/1987 | Jones |
| 4,646,538 A | 3/1987 | Blackshaw et al. |
| 4,685,307 A | 8/1987 | Jones |
| 4,693,089 A | 9/1987 | Bourne et al. |
| 4,698,978 A | 10/1987 | Jones |
| 4,727,727 A | 3/1988 | Reedy |
| 4,766,734 A | 8/1988 | Dudley |
| 4,776,180 A | 10/1988 | Patton et al. |
| 4,796,437 A | 1/1989 | James |
| 4,798,059 A | 1/1989 | Morita |
| 4,799,363 A | 1/1989 | Nakamura |
| 4,835,976 A | 6/1989 | Torrence |
| 4,856,578 A | 8/1989 | McCahill |
| 4,893,476 A | 1/1990 | Bos et al. |
| 4,909,041 A | 3/1990 | Jones |
| 4,920,757 A | 5/1990 | Gazes et al. |
| 4,924,681 A | 5/1990 | De Vit et al. |
| 4,938,032 A | 7/1990 | Mudford |
| 5,038,580 A | 8/1991 | Hart |
| 5,044,425 A | 9/1991 | Tatsumi et al. |
| 5,081,848 A | 1/1992 | Rawlings et al. |
| 5,088,296 A | 2/1992 | Hamaoka |
| 5,099,651 A | 3/1992 | Fischer |
| 5,105,629 A | 4/1992 | Parris et al. |
| 5,136,855 A | 8/1992 | Lenarduzzi |
| 5,172,564 A | 12/1992 | Reedy |
| 5,187,944 A | 2/1993 | Jarosch |
| 5,224,357 A | 7/1993 | Galiyano et al. |
| 5,269,153 A | 12/1993 | Cawley |
| 5,305,822 A | 4/1994 | Kogetsu et al. |
| 5,309,732 A | 5/1994 | Sami |
| 5,323,844 A | 6/1994 | Sumitani et al. |
| 5,339,890 A | 8/1994 | Rawlings |
| 5,355,688 A | 10/1994 | Rafalovich et al. |
| 5,372,016 A | 12/1994 | Rawlings |
| 5,438,846 A | 8/1995 | Datta |
| 5,461,876 A | 10/1995 | Dressler |
| 5,465,588 A | 11/1995 | McCahill et al. |
| 5,477,914 A | 12/1995 | Rawlings |
| 5,497,629 A | 3/1996 | Rafalovich et al. |
| 5,507,337 A | 4/1996 | Rafalovich et al. |
| 5,533,355 A | 7/1996 | Rawlings |
| 5,564,282 A | 10/1996 | Kaye |
| 5,613,372 A | 3/1997 | Beal et al. |
| 5,619,864 A | 4/1997 | Reedy |
| 5,628,200 A | 5/1997 | Pendergrass |
| 5,651,265 A | 7/1997 | Grenier |
| 5,669,224 A | 9/1997 | Lenarduzzi |
| 5,689,966 A | 11/1997 | Zess et al. |
| 5,729,985 A | 3/1998 | Yoshihara et al. |
| 5,758,514 A | 6/1998 | Genung et al. |
| 5,802,864 A | 9/1998 | Yarbrough et al. |
| 5,927,088 A | 7/1999 | Shaw |
| 6,032,472 A | 3/2000 | Heinrichs et al. |
| 6,070,423 A | 6/2000 | Hebert |
| 6,082,125 A | 7/2000 | Savtchenko |
| 6,123,147 A | 9/2000 | Pittman |
| 6,149,066 A | 11/2000 | Perry et al. |
| 6,167,715 B1 | 1/2001 | Hebert |
| 6,212,892 B1 | 4/2001 | Rafalovich |
| 6,227,003 B1 | 5/2001 | Smolinsky |
| 6,253,564 B1 | 7/2001 | Yarbrough et al. |
| 6,347,527 B1 | 2/2002 | Bailey et al. |
| 6,385,983 B1 | 5/2002 | Sakki et al. |
| 6,418,745 B1 | 7/2002 | Ratliff |
| 6,434,960 B1 | 8/2002 | Rousseau |
| 6,474,087 B1 | 11/2002 | Lifson |
| 6,536,221 B2 | 3/2003 | James |
| 6,655,164 B2 | 12/2003 | Rogstam |
| 6,662,864 B2 | 12/2003 | Burk et al. |
| 6,668,572 B1 | 12/2003 | Seo et al. |
| 6,694,750 B1 | 2/2004 | Lifson et al. |
| 6,729,151 B1 | 5/2004 | Thompson |
| 6,751,972 B1 | 6/2004 | Jungwirth |
| 6,804,975 B2 | 10/2004 | Park |
| 6,817,205 B1 | 11/2004 | Lifson et al. |
| 6,826,921 B1 | 12/2004 | Uselton |
| 6,857,285 B2 | 2/2005 | Hebert |
| 6,892,553 B1 | 5/2005 | Lifson et al. |
| 6,915,656 B2 | 7/2005 | Ratliff |
| 6,931,879 B1 | 8/2005 | Wiggs |
| 6,938,438 B2 | 9/2005 | Lifson et al. |
| 6,941,770 B1 | 9/2005 | Taras et al. |
| 7,000,423 B2 | 2/2006 | Lifson et al. |
| 7,059,151 B2 | 6/2006 | Taras et al. |
| 7,114,349 B2 | 10/2006 | Lifson et al. |
| 7,150,160 B2 | 12/2006 | Herbert |
| 7,155,922 B2 | 1/2007 | Harmon et al. |
| 7,185,505 B2 | 3/2007 | Kamimura |
| RE39,597 E | 5/2007 | Rousseau |
| 7,210,303 B2 | 5/2007 | Zhang et al. |
| 7,228,707 B2 | 6/2007 | Lifson et al. |
| 7,234,311 B2 | 6/2007 | Lifson et al. |
| 7,254,955 B2 | 8/2007 | Otake et al. |
| 7,263,848 B2 | 9/2007 | Bhatti |
| 7,272,948 B2 | 9/2007 | Taras et al. |
| 7,275,385 B2 | 10/2007 | Abel et al. |
| 7,325,414 B2 | 2/2008 | Taras et al. |
| 7,454,919 B2 | 11/2008 | Ookoshi et al. |
| 7,484,374 B2 | 2/2009 | Pham et al. |
| 7,617,697 B2 | 11/2009 | McCaughan |
| 7,654,104 B2 | 2/2010 | Groll et al. |
| 7,716,943 B2 | 5/2010 | Seefeldt |
| 7,770,405 B1 | 8/2010 | Dillon |
| 7,823,404 B2 | 11/2010 | Hanson |
| 7,845,190 B2 | 12/2010 | Pearson |
| 7,854,137 B2 | 12/2010 | Lifson et al. |
| 7,856,834 B2 | 12/2010 | Haley |
| 7,913,501 B2 | 3/2011 | Ellis et al. |
| 7,937,960 B2 | 5/2011 | Matsui |
| 7,958,737 B2 | 6/2011 | Lifson et al. |
| 7,975,495 B2 | 7/2011 | Voorhis et al. |
| 7,975,506 B2 | 7/2011 | James et al. |
| 7,997,092 B2 | 8/2011 | Lifson et al. |
| 8,037,713 B2 | 10/2011 | Haley et al. |
| 8,074,459 B2 | 12/2011 | Murakami et al. |
| 8,079,228 B2 | 12/2011 | Lifson et al. |

(56) References Cited

U.S. PATENT DOCUMENTS

| | | |
|---|---|---|
| 8,079,229 B2 | 12/2011 | Lifson et al. |
| 8,082,751 B2 | 12/2011 | Wiggs |
| 8,136,364 B2 | 3/2012 | Lifson et al. |
| 8,191,376 B2 | 6/2012 | Fox et al. |
| 8,220,531 B2 | 7/2012 | Murakami et al. |
| 8,286,438 B2 | 10/2012 | McCahill |
| 8,418,482 B2 | 4/2013 | Bush et al. |
| 8,418,486 B2 | 4/2013 | Taras et al. |
| 8,424,326 B2 | 4/2013 | Mitra et al. |
| 8,459,052 B2 | 6/2013 | Bush et al. |
| 8,528,359 B2 | 9/2013 | Lifson et al. |
| 8,561,425 B2 | 10/2013 | Mitra et al. |
| 8,650,893 B2 | 2/2014 | Hanson |
| 8,733,429 B2 | 5/2014 | Harrison et al. |
| 8,756,943 B2 | 6/2014 | Chen et al. |
| 8,769,982 B2 | 7/2014 | Ignatiev et al. |
| 8,984,903 B2 | 3/2015 | Itoh et al. |
| 9,052,125 B1 | 6/2015 | Dostal |
| 9,562,700 B2 | 2/2017 | Watanabe |
| 10,072,856 B1 | 9/2018 | Akin et al. |
| 10,118,462 B2 | 11/2018 | Kohigashi et al. |
| 10,119,738 B2 | 11/2018 | Hammond et al. |
| 10,345,004 B1 | 7/2019 | Hern et al. |
| 10,753,661 B2 | 8/2020 | Hammond et al. |
| 10,866,002 B2 | 12/2020 | Taras et al. |
| 10,871,314 B2 | 12/2020 | Taras et al. |
| 10,935,260 B2 | 3/2021 | Taras et al. |
| 2003/0061822 A1 | 4/2003 | Rafalovich |
| 2003/0221436 A1 | 12/2003 | Xu |
| 2003/0221445 A1 | 12/2003 | Smolinsky |
| 2006/0010908 A1 | 1/2006 | Taras et al. |
| 2006/0218949 A1 | 10/2006 | Ellis et al. |
| 2006/0225445 A1 | 10/2006 | Lifson et al. |
| 2007/0074536 A1 | 4/2007 | Bai |
| 2007/0289319 A1 | 12/2007 | Kim et al. |
| 2007/0295477 A1 | 12/2007 | Mueller et al. |
| 2008/0016895 A1 | 1/2008 | Kim et al. |
| 2008/0041072 A1 | 2/2008 | Seefeldt |
| 2008/0173034 A1 | 7/2008 | Shaw |
| 2008/0196418 A1 | 8/2008 | Lifson et al. |
| 2008/0197206 A1 | 8/2008 | Murakami et al. |
| 2008/0209930 A1 | 9/2008 | Taras et al. |
| 2008/0256975 A1 | 10/2008 | Lifson et al. |
| 2008/0282718 A1 | 11/2008 | Beagle |
| 2008/0296396 A1 | 12/2008 | Corroy et al. |
| 2008/0302113 A1 | 12/2008 | Yin et al. |
| 2008/0302118 A1 | 12/2008 | Chen et al. |
| 2008/0302129 A1 | 12/2008 | Mosemann et al. |
| 2008/0307813 A1 | 12/2008 | Lifson et al. |
| 2009/0000611 A1* | 1/2009 | Kaiser ............... F24F 3/001 126/637 |
| 2009/0107656 A1 | 4/2009 | Marois |
| 2009/0208331 A1 | 8/2009 | Haley et al. |
| 2009/0294097 A1 | 12/2009 | Rini et al. |
| 2009/0314014 A1 | 12/2009 | Ericsson |
| 2010/0005821 A1 | 1/2010 | McCahill |
| 2010/0005831 A1 | 1/2010 | Vaisman et al. |
| 2010/0024470 A1 | 2/2010 | Lifson et al. |
| 2010/0058781 A1 | 3/2010 | Lifson et al. |
| 2010/0064710 A1 | 3/2010 | Slaughter |
| 2010/0064722 A1 | 3/2010 | Taras |
| 2010/0077788 A1 | 4/2010 | Lewis |
| 2010/0114384 A1 | 5/2010 | Maxwell |
| 2010/0132399 A1 | 6/2010 | Mitra et al. |
| 2010/0199715 A1 | 8/2010 | Lifson et al. |
| 2010/0251750 A1 | 10/2010 | Lifson et al. |
| 2010/0281894 A1 | 11/2010 | Huff |
| 2010/0287969 A1 | 11/2010 | Ueda et al. |
| 2010/0326100 A1 | 12/2010 | Taras et al. |
| 2011/0023515 A1 | 2/2011 | Kopko et al. |
| 2011/0036119 A1 | 2/2011 | Fujimoto et al. |
| 2011/0041523 A1 | 2/2011 | Taras et al. |
| 2011/0061413 A1 | 3/2011 | Setoguchi |
| 2011/0079032 A1 | 4/2011 | Taras et al. |
| 2011/0088426 A1 | 4/2011 | Lochtefeld |
| 2011/0094248 A1 | 4/2011 | Taras et al. |
| 2011/0094259 A1 | 4/2011 | Lifson et al. |
| 2011/0132007 A1 | 6/2011 | Weyna et al. |
| 2011/0174014 A1 | 7/2011 | Scarcella et al. |
| 2011/0203299 A1 | 8/2011 | Jing et al. |
| 2011/0209490 A1 | 9/2011 | Mijanovic et al. |
| 2011/0259025 A1 | 10/2011 | Noh et al. |
| 2011/0289950 A1 | 12/2011 | Kim et al. |
| 2011/0289952 A1 | 12/2011 | Kim et al. |
| 2012/0011866 A1 | 1/2012 | Scarcella et al. |
| 2012/0067965 A1 | 3/2012 | Rajasekaran et al. |
| 2012/0103005 A1 | 5/2012 | Kopko et al. |
| 2012/0198867 A1 | 8/2012 | Ng et al. |
| 2012/0205077 A1 | 8/2012 | Zinger et al. |
| 2012/0247134 A1 | 10/2012 | Gurin |
| 2012/0291460 A1 | 11/2012 | Aoyagi |
| 2013/0014451 A1 | 1/2013 | Russell et al. |
| 2013/0031934 A1 | 2/2013 | Huff et al. |
| 2013/0098085 A1 | 4/2013 | Judge et al. |
| 2013/0104574 A1 | 5/2013 | Dempsey et al. |
| 2013/0180266 A1 | 7/2013 | Bois |
| 2013/0269378 A1 | 10/2013 | Wong |
| 2013/0305756 A1 | 11/2013 | Gomes et al. |
| 2014/0013782 A1 | 1/2014 | Kopko et al. |
| 2014/0013788 A1 | 1/2014 | Kopko et al. |
| 2014/0033753 A1 | 2/2014 | Lu et al. |
| 2014/0033755 A1 | 2/2014 | Wong |
| 2014/0053585 A1 | 2/2014 | Huff |
| 2014/0060101 A1 | 3/2014 | Styles et al. |
| 2014/0123689 A1 | 5/2014 | Ellis et al. |
| 2014/0245770 A1 | 9/2014 | Chen et al. |
| 2014/0260392 A1 | 9/2014 | Hawkins et al. |
| 2015/0052937 A1 | 2/2015 | Hung |
| 2015/0059373 A1 | 3/2015 | Maiello et al. |
| 2015/0204586 A1 | 7/2015 | Burg et al. |
| 2015/0285539 A1 | 10/2015 | Kopko |
| 2017/0010029 A9 | 1/2017 | Reytblat et al. |
| 2017/0227250 A1 | 8/2017 | Karamanos |
| 2018/0010829 A1 | 1/2018 | Taras et al. |
| 2018/0313555 A1 | 11/2018 | Henderson |
| 2019/0032981 A1 | 1/2019 | Hammond et al. |
| 2019/0178509 A1 | 6/2019 | Taras et al. |
| 2020/0072510 A1 | 3/2020 | Brown |
| 2020/0378667 A1 | 12/2020 | Hammond et al. |
| 2021/0018234 A1 | 1/2021 | Lingrey et al. |
| 2021/0131709 A1 | 5/2021 | Taras et al. |
| 2021/0180807 A1 | 6/2021 | Taras et al. |

FOREIGN PATENT DOCUMENTS

| | | |
|---|---|---|
| CN | 201944952 U | 8/2011 |
| CN | 102353126 A | 2/2012 |
| CN | 203231582 U | 10/2013 |
| CN | 103471275 A | 12/2013 |
| CN | 203396155 U | 1/2014 |
| CN | 203432025 U | 2/2014 |
| EP | 134015 | 3/1985 |
| EP | 1983275 A1 | 10/2008 |
| JP | 2000046417 | 2/2000 |
| JP | 2000274786 | 10/2000 |
| JP | 2000314563 | 11/2000 |
| JP | 2001248931 | 9/2001 |
| KR | 100963221 B1 | 6/2010 |
| WO | 9600370 | 1/1996 |
| WO | 2001/90663 | 11/2001 |
| WO | 2006/033782 | 3/2006 |
| WO | 2008/045086 | 4/2008 |
| WO | 2008/048252 | 4/2008 |
| WO | 2010/005918 | 1/2010 |
| WO | 2010/054498 | 5/2010 |
| WO | 2010/104709 | 9/2010 |
| WO | 2013/142760 | 9/2013 |

(56) References Cited

FOREIGN PATENT DOCUMENTS

| WO | 2014/031559 A1 | 2/2014 |
|---|---|---|
| WO | 2014/031708 A1 | 2/2014 |

OTHER PUBLICATIONS

B.P. Rasmussen et al., "Model-Driven System Identification of Transcritical Vapor Compression Systems," IEEE Transactions on Control Systems Technology, May 2005, pp. 444-451, vol. 13 (8 pages).
"Economized Vapor Injection (EVI) Compressors," Emerson Climate Technologies Application Engineering Bulletin AE4-1327 R2, Revised Sep. 2006 (9 pages).
Ekaterina Vi Nogradova, "Economizers in Chiller Systems," Bachelor's Thesis, Mikkelin Ammattikorkeakoulu, Nov. 2012 (50 pages).
"Enhanced Vapour Injection (EVI) forZH*KVE Scroll Compressors," Emerson Climate Technologies—Technical Information, C7.4. 3/1107-0512/E, May 2012 (10 pages).
Haraldsson et al., "Measurement of Performance and Evaluation of a Heat Pump—with Scroll Compressor EVI and Economizer," Lunds Institute of Technology, 2006 (4 pages).
John P. Elson et al., "Scroll Technology: An Overview of Past, Present and Future Developments," International Compressor Engineering Conference, 2008, Paper 1871 (9 pages).
Lund et al., "Geothermal (Ground-Source Heat Pumps—A World Overview," GHC Bulletin, Sep. 2004 (edited and updated version of the article from Renewal Energy World, (July-Aug. 2003), vol. 6 No. 4) (10 pages).
Tolga N. Aynur, "Variable Refrigerant Flow Systems: A Review, Energy and Buildings," Jan. 2010, pp. 1106-1112, vol. 42 (7 pages).
Wei Yang et al., "The Design Method of U-Bend Geothermal Heat Exchanger of DX-GCHP in Cooling Model," IEEE, 2011, pp. 3635-3637 (English Abstract) (3 pages).
"Heat pumps in residential and commercial buildings" http://www.heatpumpcentre.org/en/aboutheatpumps/heatpumpsinresidential/Sidor/default.aspx (Accessed Apr. 20, 2011) (2 pages).
"Heat Pump Mechanics" http://www.geo4va.vt.edu/A3/A3.htm#A3sec3c (Accessed Apr. 20, 2011) (19 pages).
Murphy et al., "Air-Source Integrated Heat Pump for Net-Zero-Energy Houses Technology Status Report," *Oak Ridge National Laboratory*, ORNL-TM-2007-112 (Jul. 2007) (93 pages).
Murphy et al., "Ground-Source Integrated Heat Pump for Net-Zero-Energy Houses Technology Status Report," *Oak Ridge National Laboratory*, ORNL-TM-2007-177 (Dec. 2007) (78 pages).
Korean Intellectual Property Office, International Search Report in International Application No. PCT/US2009/049734 (dated Jan. 20, 2010) (2 pages).
Korean Intellectual Property Office, International Search Report in International Application No. PCT/US2010/026010 (dated Sep. 28, 2010) (2 pages).
International Search Report and Written Opinion issued in International Application No. PCT/US2013/033433 dated Aug. 9, 2013 (11 Pages).
International Preliminary Report on Patentability issued in International Application No. PCT/US2013/033433 dated Sep. 23, 2014 (7 Pages).
Third Party Submission dated Nov. 10, 2014 filed in U.S. Appl. No. 13/848,342 (13 Pages).
Honeywell, VFF1, VFF2, VFF3, VFF6 Resilient Seat Butterfly Valves with Flanged Connections Jan. 2013, p. 1, 1st column, last paragraph. (Year: 2013) (20 pages).
Taras, Michael F., "Reheat Which Concept is Best," *ASHRAE Journal: 35-40* (Dec. 2004) (7 pages).

* cited by examiner

HYBRID HEAT PUMP WITH IMPROVED DEHUMIDIFICATION

CROSS-REFERENCE TO RELATED APPLICATIONS

This application is a continuation of U.S. Nonprovisional application Ser. No. 15/725,148, filed on Oct. 4, 2017, which claims the benefit of U.S. Provisional Patent Application No. 62/419,526, filed Nov. 9, 2016, all of which are incorporated by reference herein in their entirety.

STATEMENT REGARDING FEDERALLY SPONSORED RESEARCH AND DEVELOPMENT

[NOT APPLICABLE]

FIELD OF THE INVENTION

The present invention relates generally to heating, ventilation, and air conditioning systems and methods and, more particularly but without limitation, to heat pump systems and hydronic systems.

BRIEF DESCRIPTION OF THE DRAWINGS

The accompanying drawings, which are incorporated into and form a part of the specification, illustrate one or more embodiments of the present invention and, together with this description, serve to explain the principles of the invention. The drawings merely illustrate preferred embodiments of the invention and are not to be construed as limiting the scope of the invention.

FIG. 3C is a flow chart illustrating the control logic of the hybrid heat pump system when the hydronic loop is operating independently in cooling mode, as shown in FIG. 3a.

DETAILED DESCRIPTION OF THE PREFERRED EMBODIMENT(S)

In recent years, the HVAC industry focus has shifted towards increased efficiency thresholds in heating and cooling systems and improved occupant's comfort level. Heat pump systems have offered improved efficiency. However, there is much demand for a higher level of flexibility and dedicated options delivering an enhanced operation in these systems. The present invention provides a hybrid heat pump system that integrates a heat pump refrigerant loop with a hydronic loop in a very efficient manner. Each of the loops can operate independently or in combination with the other in both heating and cooling modes. Still further, the hydronic loop can provide a reheat function when the heat pump loop is operating in a cooling mode to deliver improved dehumidification of the conditioned air. These and other features and advantages of the present invention will be apparent from the following description with reference to the accompanying drawings.

Figure 1:
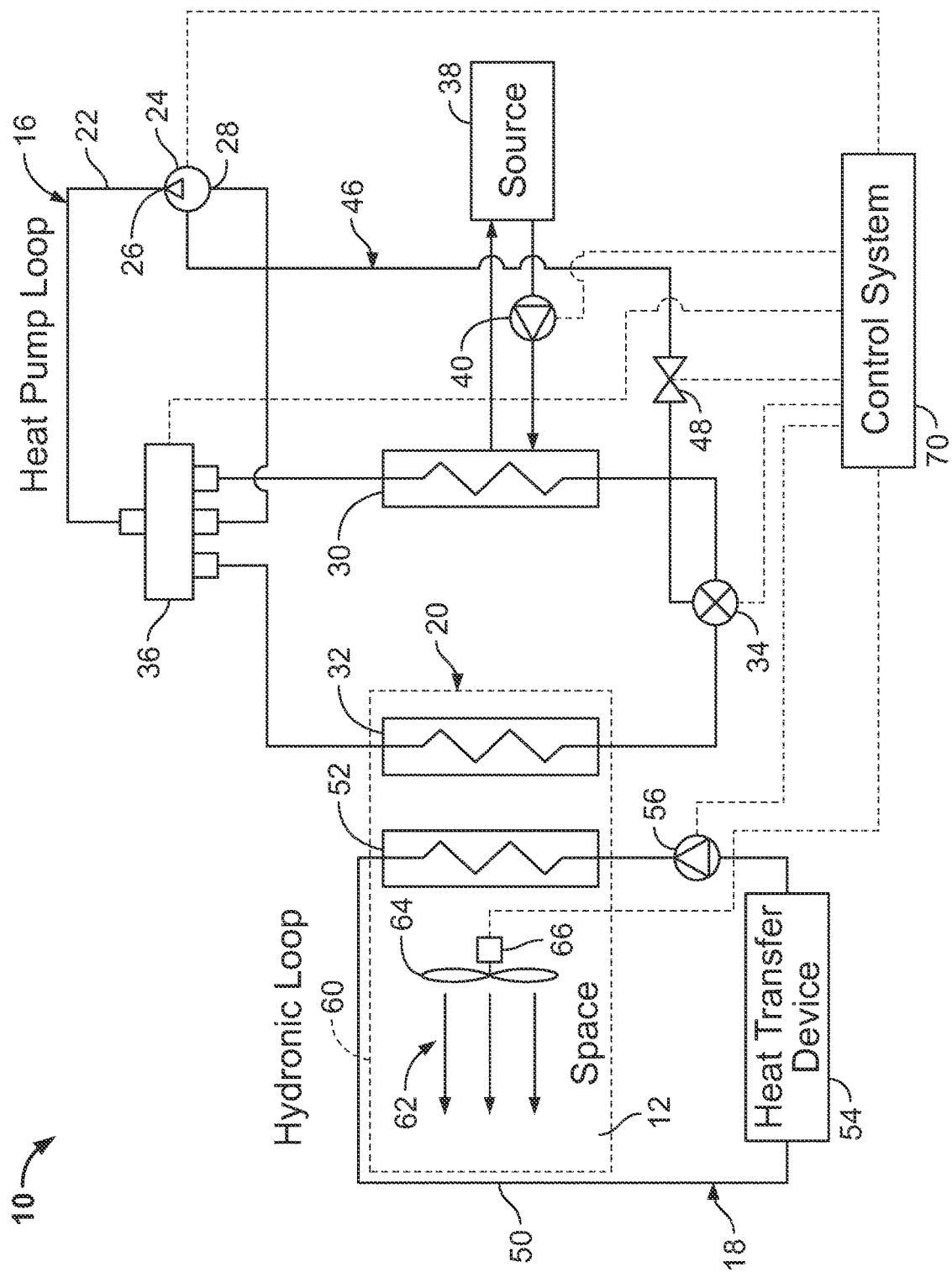
FIG. 1 is a schematic diagram showing the basic components of a hybrid heat pump system constructed in accordance with a preferred embodiment of the present invention. The hydronic heat exchanger is positioned downstream of the space heat exchanger with respect to the airflow.

Turning now to the drawings in general and to FIG. 1 in particular a first preferred embodiment of the hybrid heat pump system of the present invention designated generally by the reference number 10. The system 10 is designed for conditioning the air in an occupied space 12. As used herein, "air conditioning" and related terms refer to heating, cooling, or dehumidifying the air, and to any combination of these. The hybrid heat pump system 10 includes a heat pump refrigerant loop 16, a hydronic loop 18, and an air circuit 20.

The heat pump loop 16 includes a refrigerant conduit or circuit 22 that fluidly connects the refrigerant circuit components. These components include a compressor 24 having a discharge outlet port 26 and a suction inlet port 28. Also included are a source heat exchanger 30 and space heat exchanger 32. An expansion device 34 is positioned in the circuit 22 between the space heat exchanger 32 and the source heat exchanger 30. A four-way reversing valve 36 is positioned in the conduit on the discharge side of the compressor 24 and is configured to operate alternately the heat pump loop 16 in a space cooling mode or a space heating mode, as explained in detail hereafter. The compressor 24 may be a variable capacity compressor, such as a variable speed compressor, a compressor with an integral pulse width modulation option, or a compressor incorporating various unloading options. These types of compressors allow for better control of the operating conditions and management of the thermal load on the heat pump loop 16.

The source heat exchanger 30 may be a refrigerant-to-water, refrigerant-to-brine, or refrigerant-to-air heat exchanger and is not limited to any particular heat exchanger type or configuration. The source heat exchanger 30 is fluidly connected to a source 38 and the fluid, usually but not necessarily water, is circulated by a pump 40. The pump 40 may be a variable capacity pump for a more efficient operation and better system control. Similarly, the space heat exchanger 32 is not limited to any particular heat exchanger type or configuration.

The expansion device 34 may be an electronic expansion valve, a mechanical expansion valve, or a fixed-orifice/capillary tube/accurator. The expansion device 34 may have bi-directional functionality or may be replaced by a pair of unidirectional expansion devices coupled with the associated bypass check valves to provide refrigerant re-routing when the flow changes direction throughout the refrigerant cycle between cooling and heating modes of operation.

In the preferred embodiment, the heat pump loop 16 further comprises a hot gas bypass designated generally at 46. The hot gas bypass comprises a bypass conduit that connects to the discharge side of the compressor 24 with the expansion device 34 and is controlled by a valve 48. The hot gas bypass concept may integrate various options and features. The hot gas bypass function controls capacity of the heat pump loop 16 by regulating the amount of refrigerant circulating through the source heat exchanger 30 and the temperature of the refrigerant flowing through the space heat exchanger 32. The hot gas bypass valve can be an ON/OFF valve, a valve controlled by the PMW signal or a modulating valve controlled by a stepper motor. Still further, other types of capacity control, such as a suction modulation valve and/or a tandem compression system, may be employed.

The hydronic loop 18 comprises a hydronic conduit or circuit 50 that fluidly connects the components. The components include a hydronic heat exchanger 52 and a hydronic heat transfer unit 54, such as a cooling tower or a boiler. A pump 56 is included in the circuit 50 for moving water or brine through the circuit 50. Preferably, the pump 56 is a variable capacity pump for more efficient operation and better control. The hydronic heat exchanger 52 may be coupled by the hydronic conduit to the source heat exchanger 30 or alternatively may be connected to an independent hydronic circuit.

The air circuit 20 comprises a system of ducts 60 that provides a conduit for air circulation through external surfaces of the space heat exchanger 32 and the hydronic heat exchanger 52. The return air from the space is passed through an air flow path indicated at 62 and conditioned by the heat pump loop 16 and the hydronic loop 18 as described hereafter. Air is circulated through the ducts 60 by a blower 64 of any suitable type usually driven by a motor 66. By way of example, the blower 64 may be of a variable flow type, wherein the motor 66 is a variable speed motor, a pulse width-modulated motor, or an ON/OFF cycling motor, to enhance operation and control of the air circuit 20.

For reasons that will become apparent, the hydronic heat exchanger 52 of the hydronic loop 18 and the space heat exchanger 32 of the heat pump loop 16 are positioned together in the air flow path 62 of the air circuit 20. In most instances, it will be advantageous to place the hydronic heat exchanger 52 downstream of the space heat exchanger 32, as this allows the hydronic loop 18 optionally to perform a reheat function for improved dehumidification of the supply air to the conditioned space 12.

Referring still to FIG. 1, the hybrid heat pump system 10 includes a control system 70 that is operatively connected to the compressor 24, the expansion device 34 (in the case of the electronic expansion device), the four-way reversing valve 36, the hot gas bypass valve 48, the pumps 40 and 56, and the fan motor 66. The control system 70 selectively operates and controls the above-mentioned components to provide different modes of operation, as explained fully below, with enhanced operational efficiency and more precise control to a desired set point in each mode.

Figure 2A:
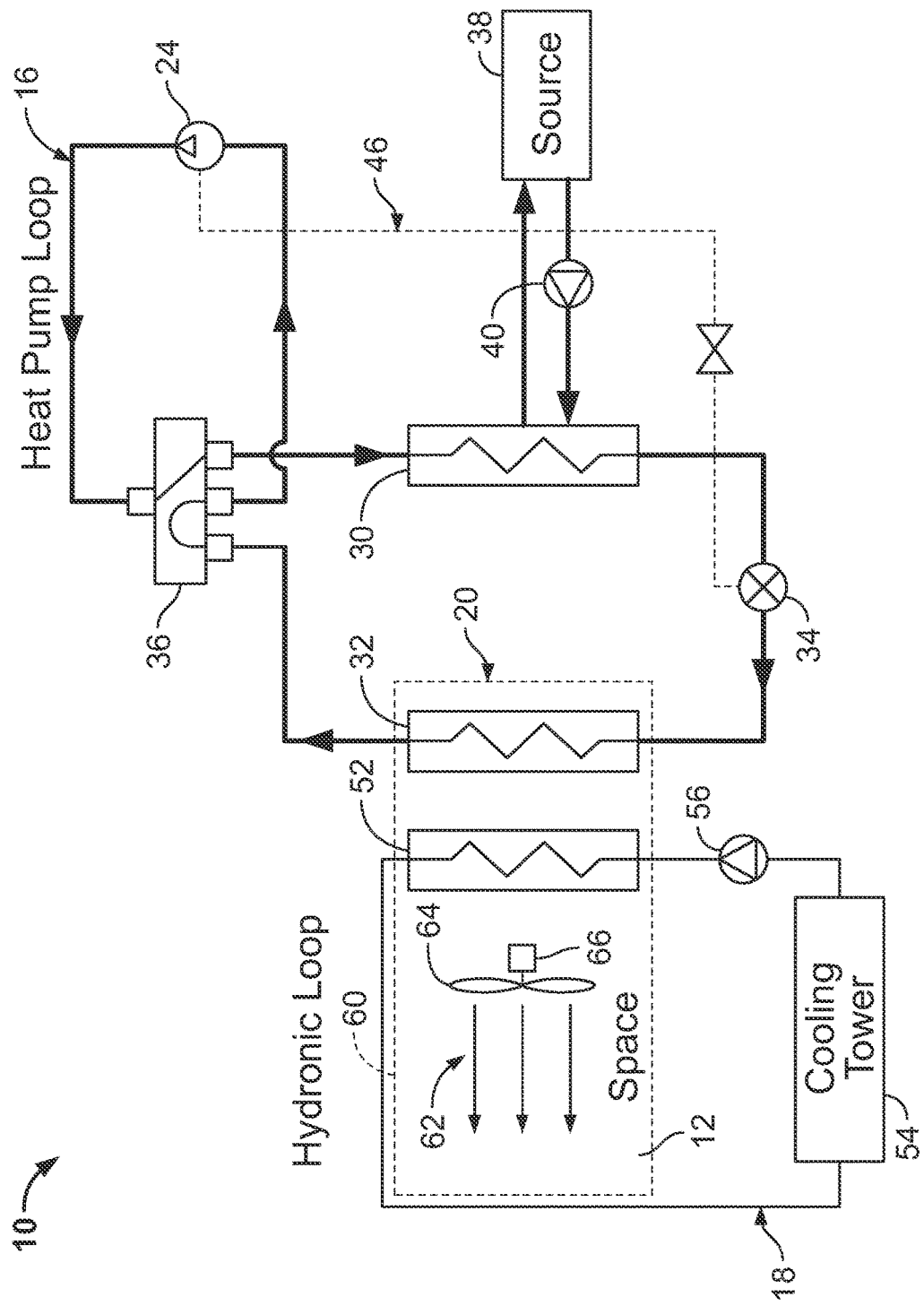
FIG. 2A is a schematic diagram of the hybrid heat pump system of FIG. 1 illustrating the operation of the hybrid heat pump system with the heat pump loop functioning independently in cooling mode. The bolded line illustrates the refrigerant flow path in the heat pump loop.
Figure 2B:
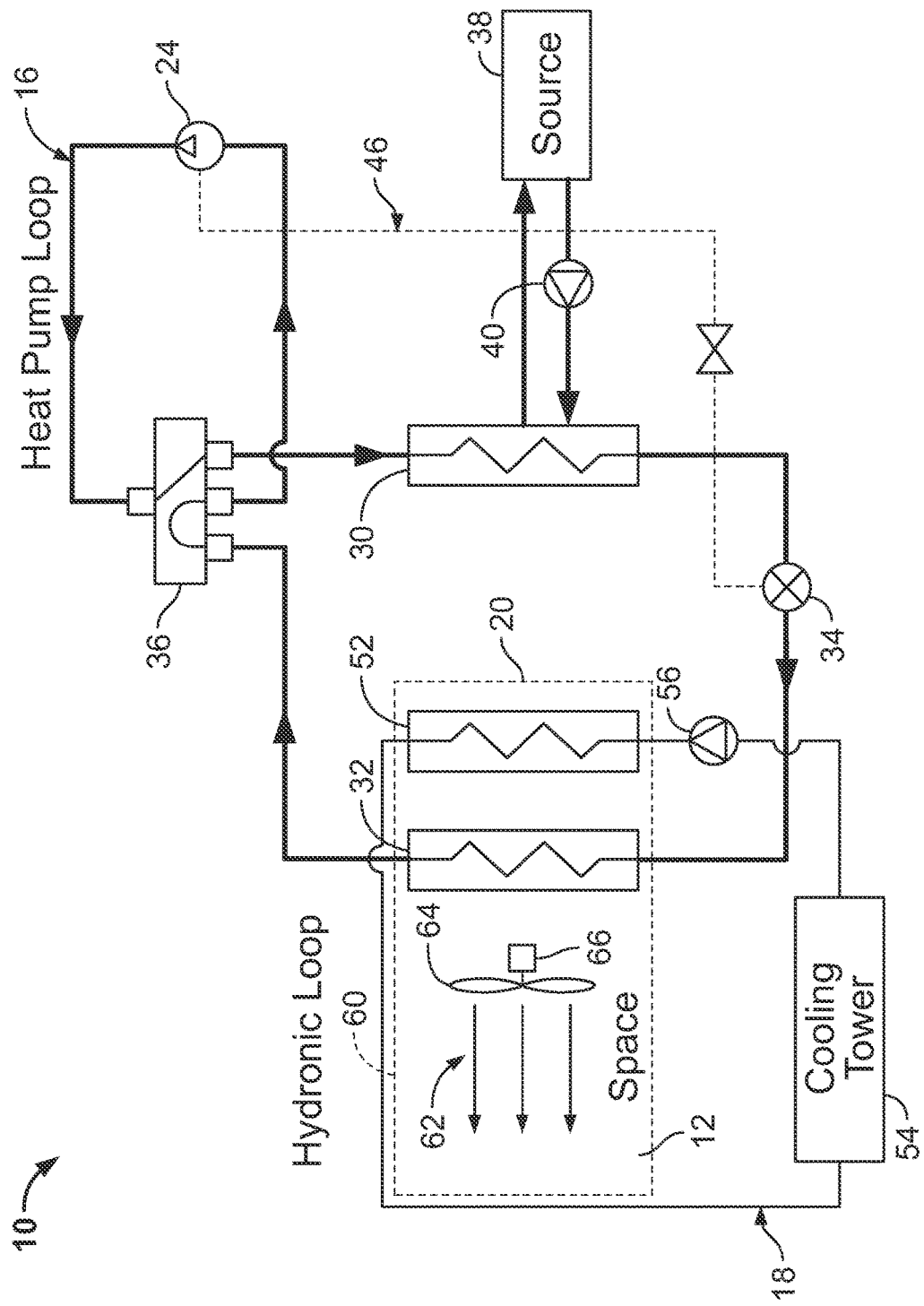
FIG. 2B is a schematic diagram of the hybrid heat pump system with the hydronic heat exchanger positioned upstream of the space heat exchanger relative to airflow. The bolded line illustrates the refrigerant flow path in the heat pump loop operating in the cooling mode.

Having described the components of the hybrid heat pump system 10, its various modes of operation now will be explained. FIG. 2A illustrates the hybrid heat pump system 10 operating in a space cooling mode in which the heat pump loop 16 is operating independently. The hot gas bypass 46 and the hydronic loop 18 are inactive. However, the hot gas bypass 46 may be employed for capacity control for the heat pump loop 16. In this embodiment, the hydronic heat exchanger 52 is positioned downstream of the space heat exchanger 32 with respect to the airflow. FIG. 2B depicts a similar cooling mode of operation for the hybrid heat pump system 10 where the hydronic heat exchanger 52 is positioned upstream of the space heat exchanger 32 with respect to the airflow.

Figure 2C:
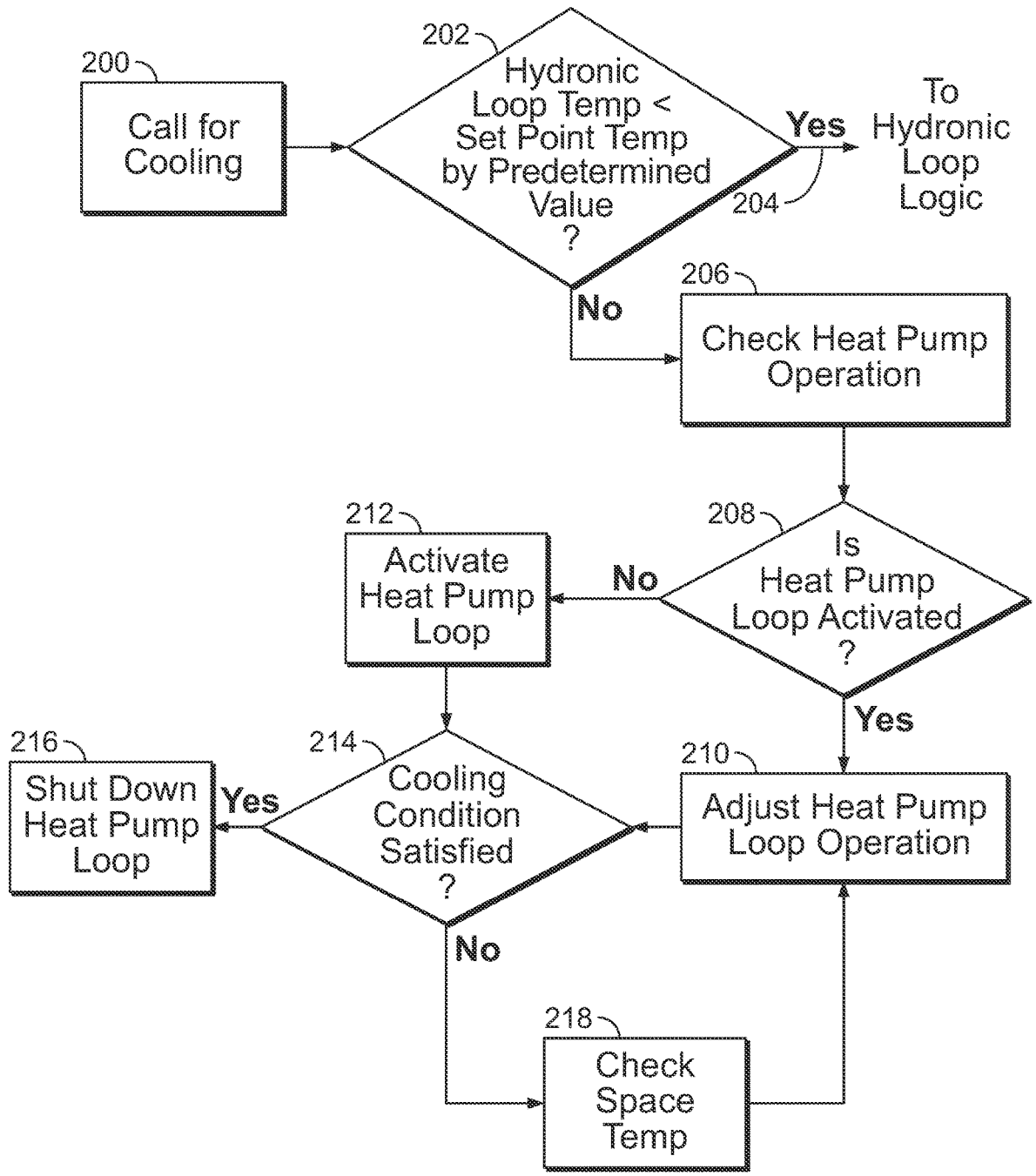
FIG. 2C is a flow chart illustrating the control logic of the hybrid heat pump system when the heat pump loop is operating independently in cooling mode, as shown in FIG. 2A.

The control logic for the operation in the cooling mode illustrated in FIGS. 2A and 2B is shown in FIG. 2C. The operation commences at 200 with a demand from the conditioned space 12 for cooling. Typically, this demand is based on the feedback from a thermostat or temperature sensor (not shown) in the conditioned space 12. At 202, the control system 70 for the heat pump system 10 verifies whether the hydronic loop 18 can be activated. If the outcome is positive, based on the hydronic loop temperature (or supply water temperature, or ambient air temperature), the hydronic loop 18 is activated at 204 and operated according to the hydronic loop control logic module. This occurs if the hydronic loop temperature is lower than the desired set point temperature in the conditioned space 12 by a pre-determined value/threshold (defined for instance by a numeric value, a tabulated set of values, a formula or an algorithm).

In the case of a negative outcome, the heat pump loop 16 is activated. At 206, operation of the heat pump loop 16 is verified. In accordance to the decision fork at 208, if the heat pump loop 16 is active, its operation adjustment may be necessary at 210. If the heat pump loop 16 is inactive, it is activated at 212.

At 214, the temperature in the conditioned space 12 is checked and compared to the desired set point temperature. If the temperature in the conditioned space 12 is higher than the desired set point temperature (within the specified tolerance band), then the control system 70 adjusts operation of the heat pump loop 16 and modulates the heat pump loop components. By way of example, the control system 70 may adjust the speed of the compressor 24, pump 40, and blower 66, as well as control the hot gas bypass valve 48 and expansion device 34 to satisfy the temperature requirements in the conditioned space 12.

If the temperature in the conditioned space 12 is lower than or equal to the desired set point temperature, the control system 70 deactivates the heat pump loop 16 at 216. The control system 70 continues to check the temperature in the conditioned space 12 at 218 and compare its value to the target temperature at 212. If the temperature in the conditioned space 12 has not yet reached the target temperature, the control system 70 will modulate operation of the components of the heat pump refrigerant loop 16, to adjust capacity of the heat pump refrigerant loop 16. As mentioned above, when the temperature condition in the conditioned space 12 is satisfied, that is, when the temperature in the conditioned space 12 has reached the target temperature within the specified tolerance band, the heat pump loop 16 is shut down at 216.

Figure 3A:
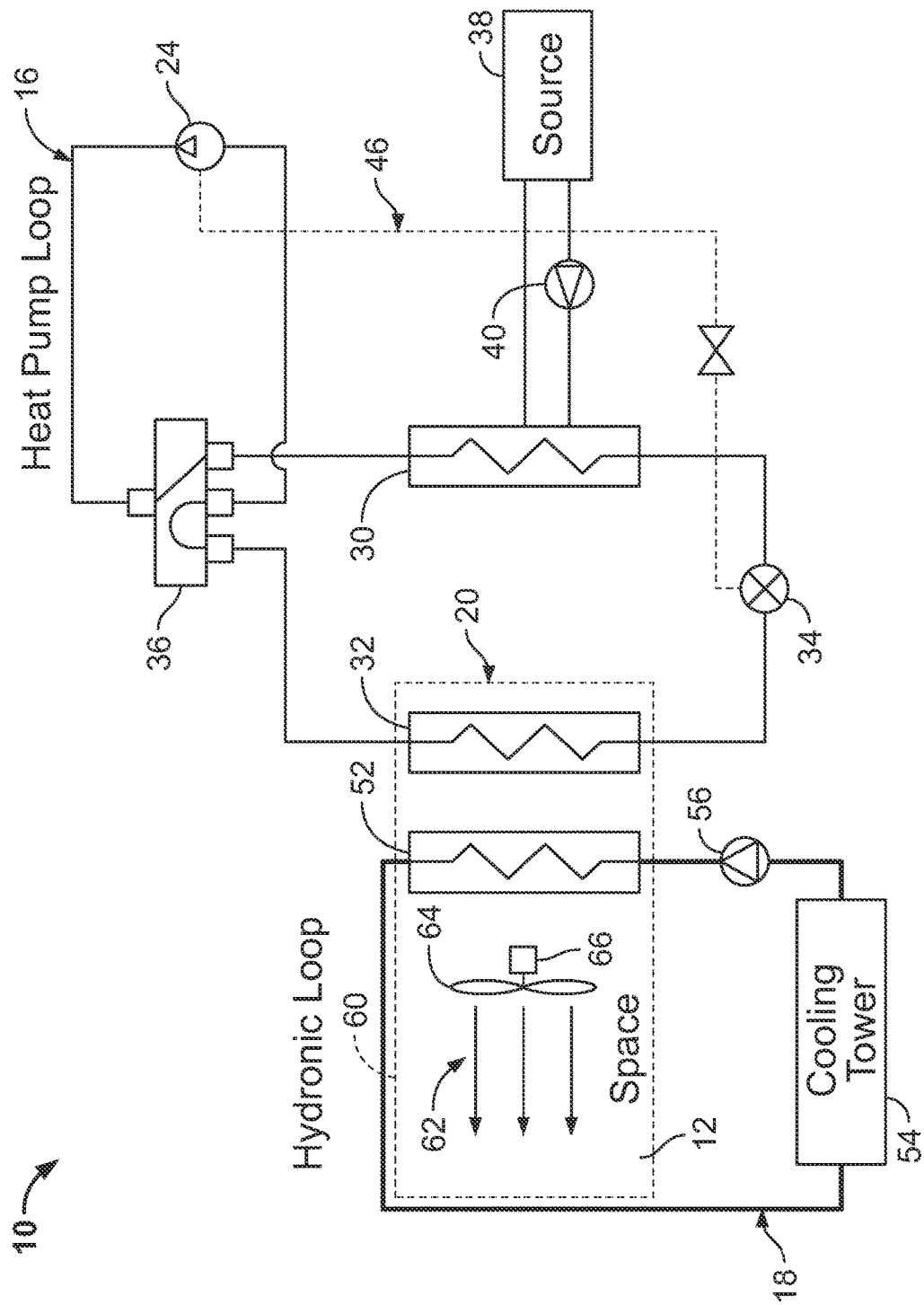
FIG. 3A is a schematic diagram of the hybrid heat pump system of FIG. 1 illustrating the operation of the system with the hydronic loop in cooling mode. The bolded line illustrates the water flow path in the hydronic loop.
Figure 3B:
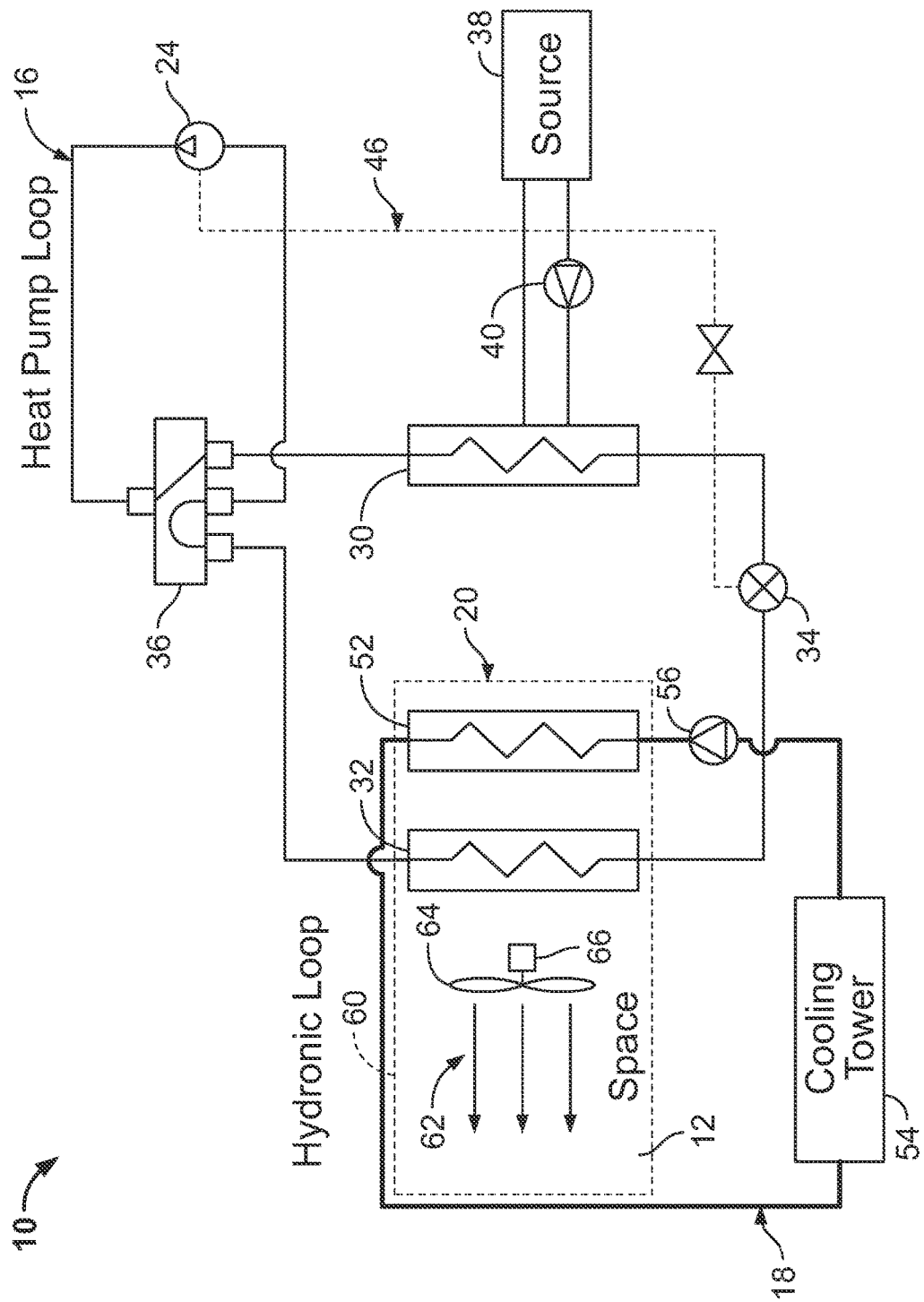
FIG. 3B is a schematic diagram of the hybrid heat pump system with the hydronic heat exchanger positioned upstream of the space heat exchanger relative to airflow. The bolded line illustrates the water flow path in the hydronic loop operating in cooling mode.

FIG. 3A illustrates a space cooling mode for the hybrid heat pump system 10 in which the hydronic loop 18 is operating independently. In this mode, the heat transfer device 54 in the hydronic loop 18 is a cooling tower or other suitable heat sink, such as an intermediate heat exchanger. The hot gas bypass 46 and the heat pump loop 16 are inactive. This mode of operation is activated when the temperature in the hydronic loop 18 (or supply water temperature, or air temperature) is lower than the desired set point temperature in the conditioned space 12 by a pre-determined value. Since the heat pump loop 16 is not activated in this mode of operation, significant power consumption reduction and operational efficiency improvement are realized. In this embodiment, the hydronic heat exchanger 52 is positioned downstream of the space heat exchanger 32 of the heat pump loop 16 with respect to the airflow. FIG. 3B depicts a similar cooling mode of operation for the hybrid heat pump system 10 when the hydronic heat exchanger 52 is positioned upstream of the space heat exchanger 32 of the heat pump loop 16 with respect to the airflow.

Figure 3C:
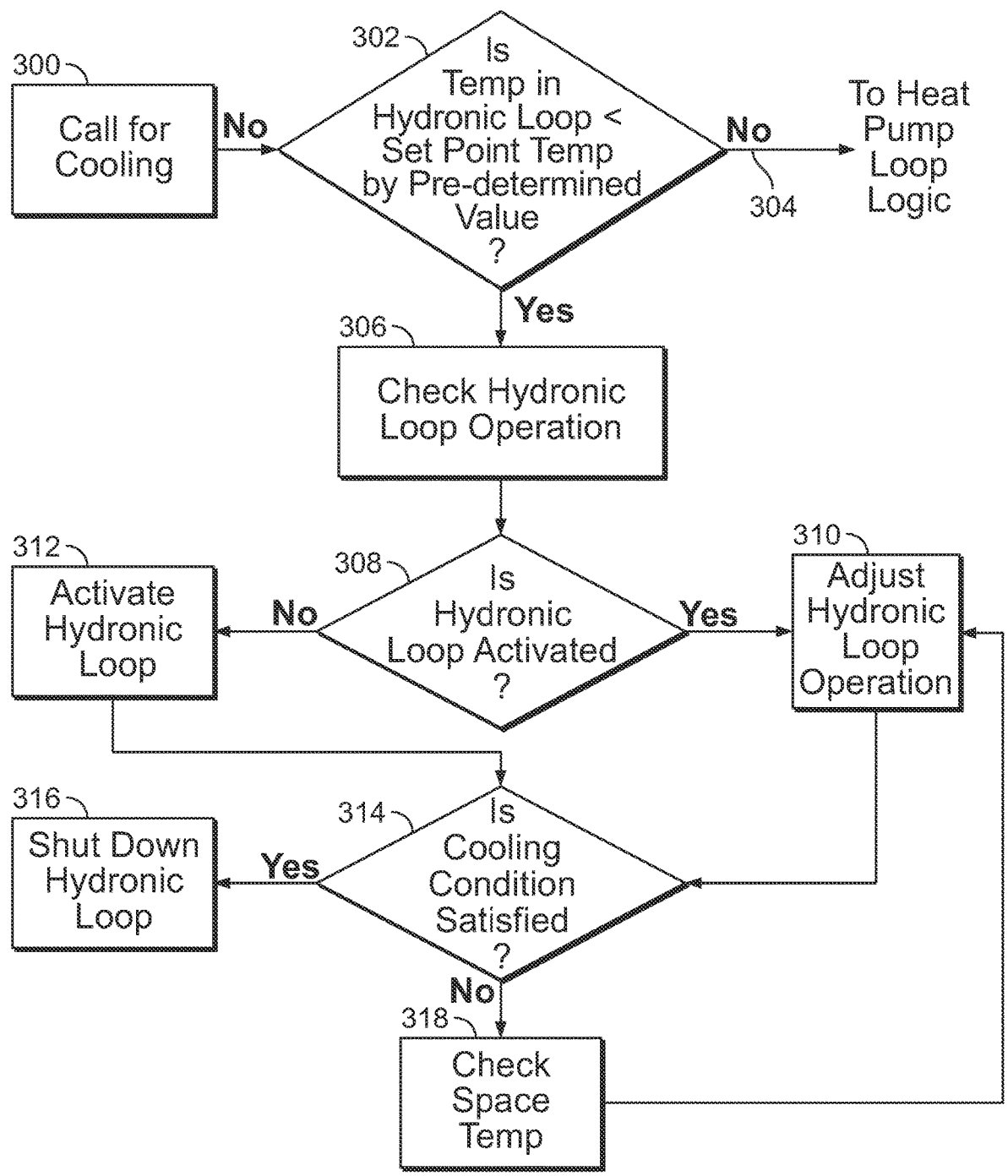

The control logic for the operation in the cooling mode illustrated in FIGS. 3A and 3B is shown in FIG. 3C. The operation commences at 300 with a demand from the conditioned space 12 for cooling. Typically, this demand is based on the feedback from a thermostat or temperature sensor (not shown) in the conditioned space 12. At 302, the control system 70 for the heat pump system 10 verifies whether the hydronic loop 18 can be activated. In the case of a negative outcome, the heat pump loop 16 is activated and operated in accordance to the heat pump loop control logic at 304.

If the outcome is positive, based on the hydronic loop temperature (or supply water temperature, or ambient air temperature), the hydronic loop 18 is activated. This occurs if the hydronic loop temperature is lower than the desired set point temperature in the conditioned space 12 by a pre-determined value/threshold (defined for instance by a numeric value, a tabulated set of values, a formula or an algorithm). At 306, operation of the hydronic loop 18 is verified. In accordance to the decision fork at 308, if the hydronic loop 18 is active, its operation adjustment may be necessary at 310. If the hydronic loop 18 is inactive, it is activated at 312.

At 314, the temperature in the conditioned space 12 is checked and compared to the desired set point temperature. If the temperature in the conditioned space 12 is higher than the desired set point temperature (within the specified tolerance band), then the control system 70 adjusts operation of the hydronic loop 18 and modulates the heat pump loop components. By way of example, the control system 70 may adjust the speed of the pump 56 and blower 66 to satisfy the temperature requirements in the conditioned space 12. If the temperature in the conditioned space 12 is lower than or equal to the desired set point temperature, the control system 70 deactivates the hydronic loop 18 at 316.

The control system 70 continues to check the temperature in the conditioned space 12 at 318 and compare its value to the target temperature at 314. If the temperature in the conditioned space 12 has not yet reached the target temperature, the control system 70 will modulate operation of the components of the hydronic loop 18, to adjust capacity of the hydronic loop 18. As mentioned above, when the temperature condition in the conditioned space 12 is satisfied, that is, when the temperature in the conditioned space 12 has reached the target temperature within the specified tolerance band, the hydronic loop 18 is shut down at 316.

Figure 4A:
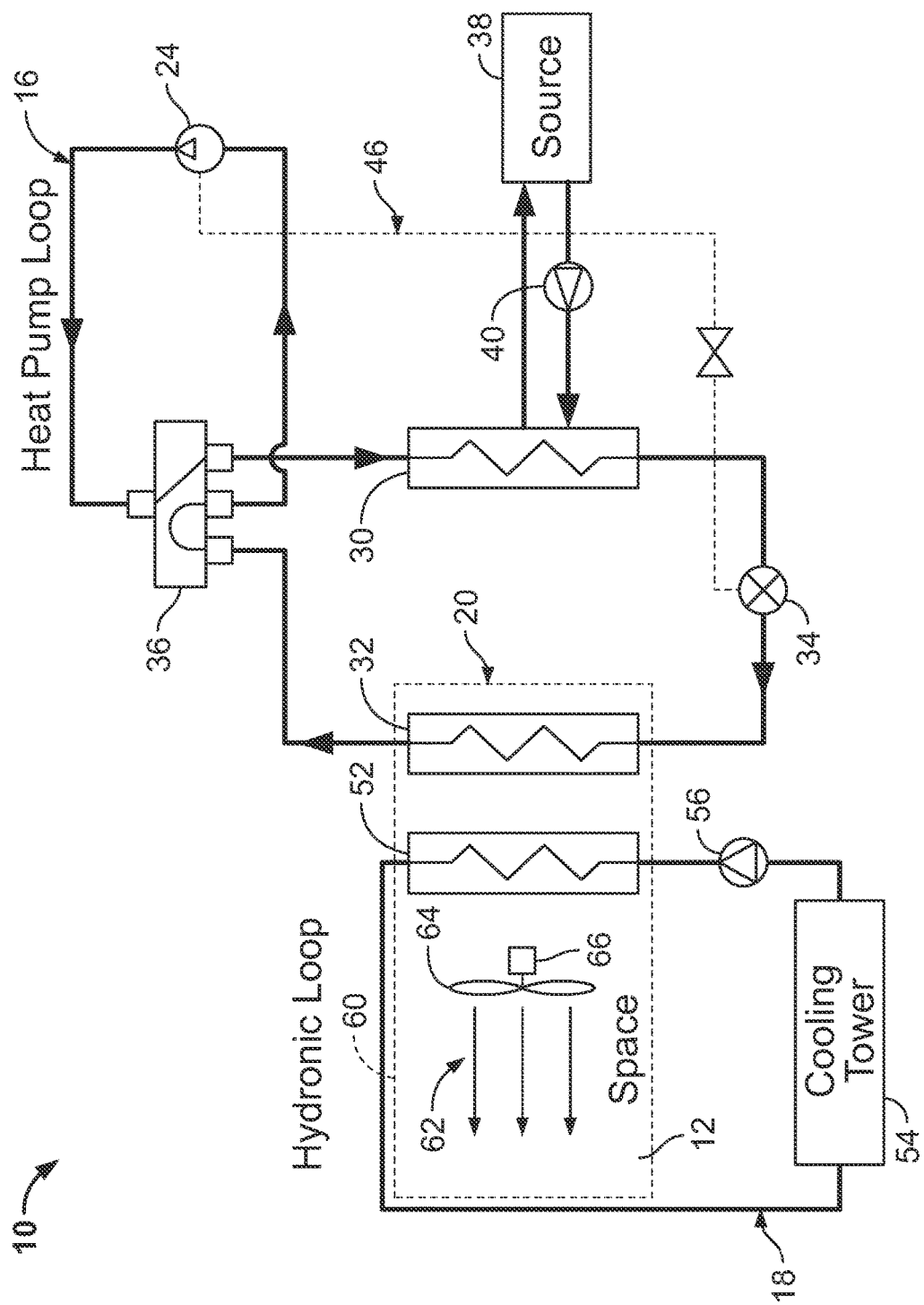
FIG. 4A is a schematic diagram of the hybrid heat pump system of FIG. 1 illustrating the operation of the system in a cooling mode in which the heat pump loop and the hydronic loop are cooling the air. The bolded line illustrates the water flow path in the hydronic loop and the heat pump loop both operating in cooling mode.

FIG. 4A illustrates the hybrid heat pump system 10 operating in an integral cooling mode in which the heat pump loop 16 and the hydronic loop 18 are operating together. As described above, the water temperature in the hydronic loop 18 must be lower than the desired set point temperature in the conditioned space 12. The hot gas bypass 46 may be activated to trim the capacity of the heat pump loop 16. This mode of operation provides additional cooling from the heat pump loop 16 when the cooling provided by the hydronic loop 18 alone is inadequate.

The operational engagement of the heat pump loop 16 may be minimal, allowing for the input power reduction, energy savings, reduced noise, and improved overall reliability for the hybrid heat pump system 10. Additionally, the air temperature downstream of the space heat exchanger 32 must be higher than the water (or brine) temperature supplied to the hydronic heat exchanger 52 by a pre-determined value and must be monitored and controlled, for instance by adjusting performance of the cooling tower 54 or modulating capacity of the heat pump loop 16. Also, the freeze protection means may be employed to prevent freezing of the fluid flowing in the hydronic heat exchanger 52 at off-design and abnormal operating conditions such as 65° F. or lower entering air temperature. In this embodiment, the hydronic heat exchanger 52 is positioned downstream of the space heat exchanger 32 with respect to the airflow.

Figure 4B:
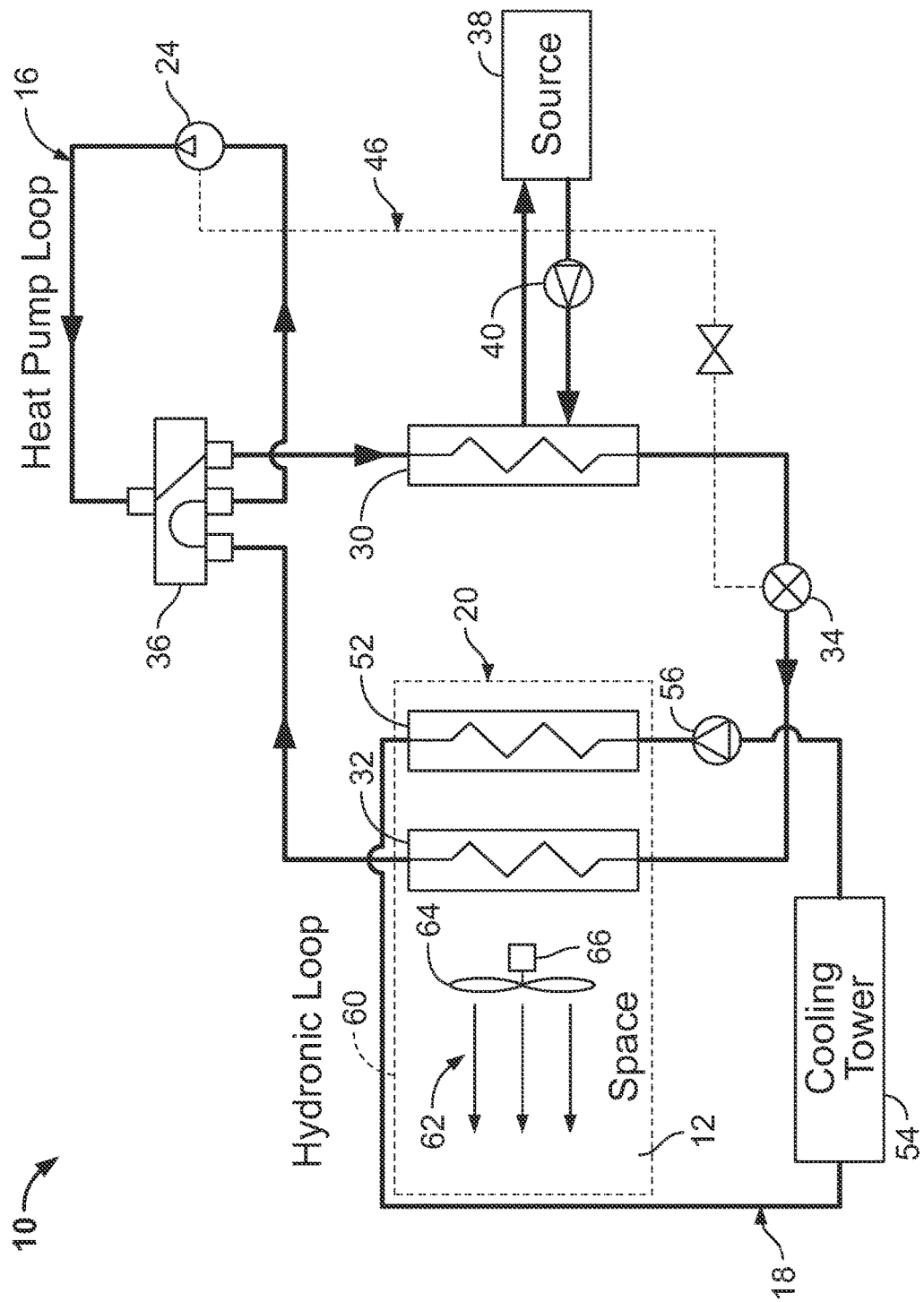
FIG. 4B is a schematic diagram of the hybrid heat pump system with the hydronic heat exchanger positioned upstream of the space heat exchanger relative to airflow. The bolded line illustrates the water flow path in the hydronic loop and the heat pump loop both operating in cooling mode.

FIG. 4B depicts a similar cooling mode of operation for the hybrid heat pump system 10 when the hydronic heat exchanger 52 is positioned upstream of the space heat exchanger 32 with respect to the airflow. Such system configuration provides more flexibility in this integral cooling mode of operation, since it is not limited by the air temperature leaving the space heat exchanger 32, and allows for a wider operational envelope and less complex system capacity control. However, in this system configuration, the reheat option cannot be integrated into the design of the hybrid heat pump system 10 by utilizing the same hydronic heat exchanger 52. It must be understood that similar freeze protection must be applied to avoid operation outside of the predetermined "safe" envelope.

Figure 4C:
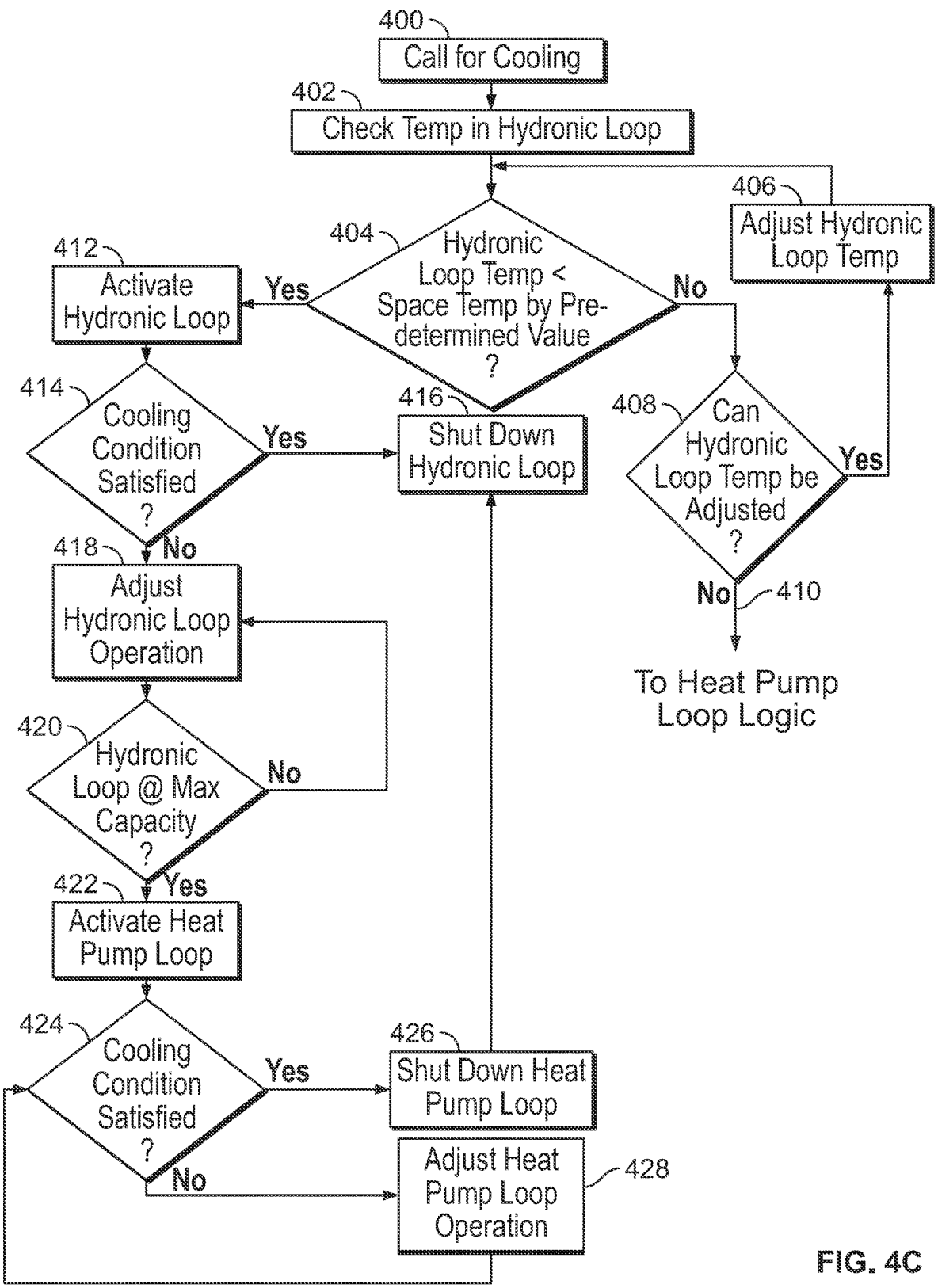
FIG. 4C is a flow chart illustrating the control logic of the hybrid heat pump system when the hydronic loop and the heat pump loop are operating integrally in cooling mode, as shown in FIG. 4A.

The control logic for the operation in the integrated cooling mode illustrated in FIGS. 4A and 4B is shown in FIG. 4C. It must be noted that for simplification purposes, the activation control logic for the heat pump loop 16 and hydronic loop 18, as well as a step for the temperature check in the conditioned space 12 are omitted and may be found in FIGS. 2C and 3C. On the other hand, the control logic for the temperature adjustment in the hydronic loop 18 can be found in FIG. 4C and extended to FIGS. 2C and 3C.

The operation commences at 400 with a demand from the conditioned space 12 for cooling. Typically, this demand is based on a feedback from a thermostat or temperature sensor (not shown) in the conditioned space 12. At 402, the temperature in the hydronic loop 18 (or supply water temperature, or ambient air temperature) is checked.

At 404, the temperature in the hydronic loop 18 is compared to the temperature in the conditioned space 12. If the temperature in the hydronic loop 18 is higher than or equal to the temperature in the conditioned space 12, then operation of the hydronic loop 18 is adjusted at 406, if such adjustment is possible as prescribed at 408. By way of example, the airflow for the cooling tower 54 or speed for the hydronic pump 56 may be adjusted. If the adjustment of operation for the hydronic loop 18 is not possible at 408, then the control logic for the heat pump loop 16 is activated at 410.

If the temperature in the hydronic loop 18 is lower than the temperature in the conditioned space 12 by a predetermined value/threshold (defined for instance by a numeric value, a tabulated set of values, a formula or an algorithm), then the hydronic loop 18 is activated at 412. The system control 70 continues to check the temperature in the conditioned space 12 and compare it to the target temperature at 414. If the temperature in the conditioned space 12 has reached the target temperature (within the specified tolerance band), the hydronic loop 18 is shut down at 416.

If the temperature in the conditioned space 12 has not reached the target temperature, operation of the hydronic loop 18 is adjusted at 418 (as described previously). At 420, the control system 70 continues to monitor the status of the hydronic loop 18 to determine if it is operating at its maximum cooling capacity. If this is not the case, further adjustment to hydronic loop operation may be made at 418 achieve higher cooling capacity.

If the input at 420 reports that the hydronic loop 18 has reached its maximum cooling capacity, then the heat pump loop 16 is activated at 422 to assist the hydronic loop 18 and provide supplemental cooling. The system control 70 continues to check the temperature in the conditioned space 12 and compare it to the target temperature at 424. If the temperature in the conditioned space 12 has reached the target temperature, the heat pump loop 16 is shut down at 426 and then the hydronic loop 18 is shut down at 416. The system control 70 continues to make adjustments to the heat pump loop 16 at 428 until the cooling condition at 420 is satisfied.

It must be understood that the control logic for the integrated cooling mode can be reversed with the heat pump loop 16 providing a primary source of cooling and the hydronic loop 18 providing supplementary cooling. Such control logic/sequence may be useful for capacity adjustment and performance trimming to provide precise temperature control and minimize discomfort for the occupant of the conditioned space 12 due to temperature variations. Also, the performance adjustment can be a continuous modulation or stepwise discrete staging of operation for both heat pump loop 16 and hydronic loop 18. Furthermore, the control logic for safe and reliable operation, as related to the hydronic loop temperature mentioned above, are omitted for clarity and simplicity.

Figure 5A:
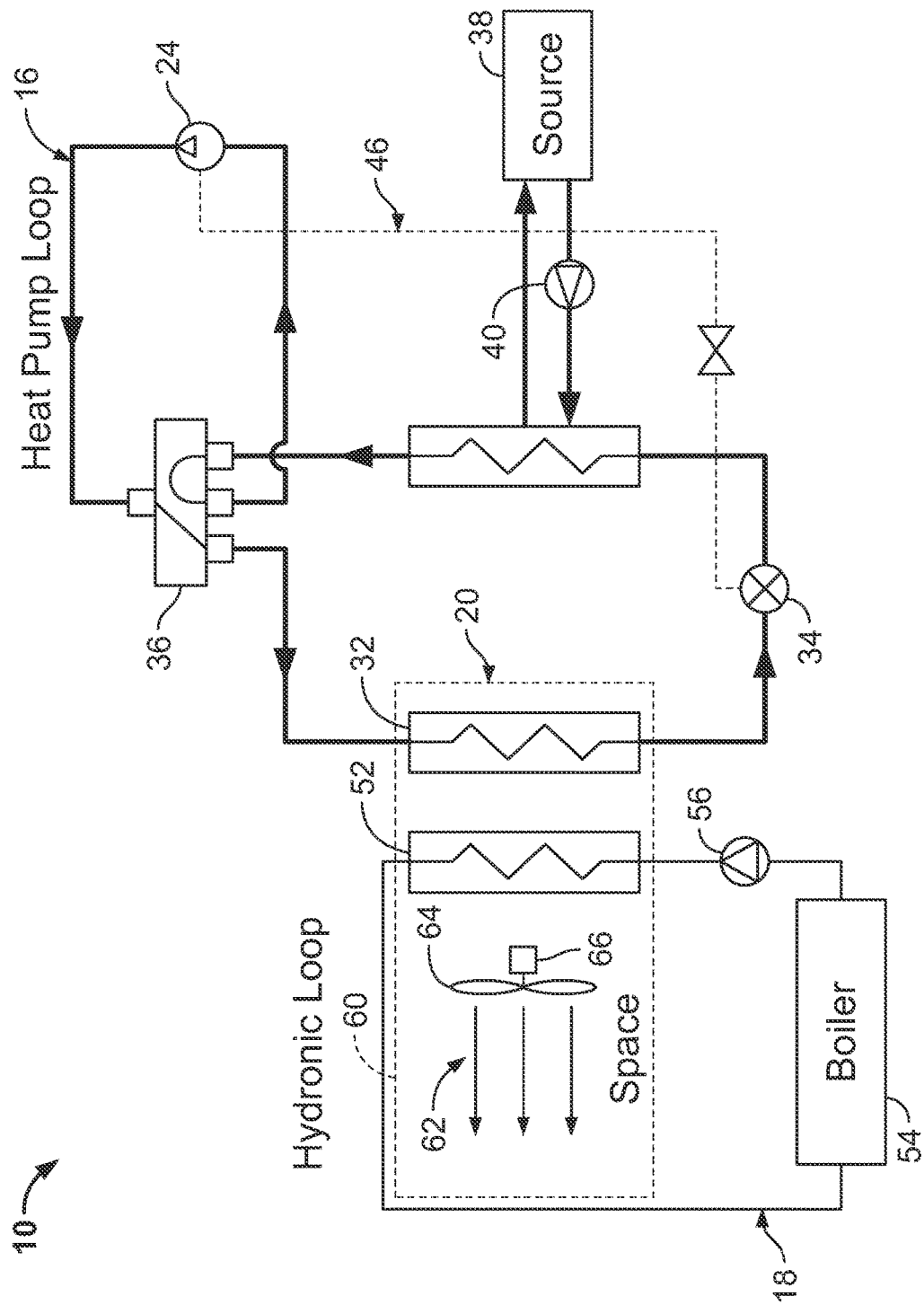
FIG. 5A is a schematic diagram of the hybrid heat pump system of FIG. 1 illustrating the operation of the system in a heating mode in which only the heat pump loop is operating. The bolded line illustrates the water flow path in the heat pump loop operating in heating mode.
Figure 5B:
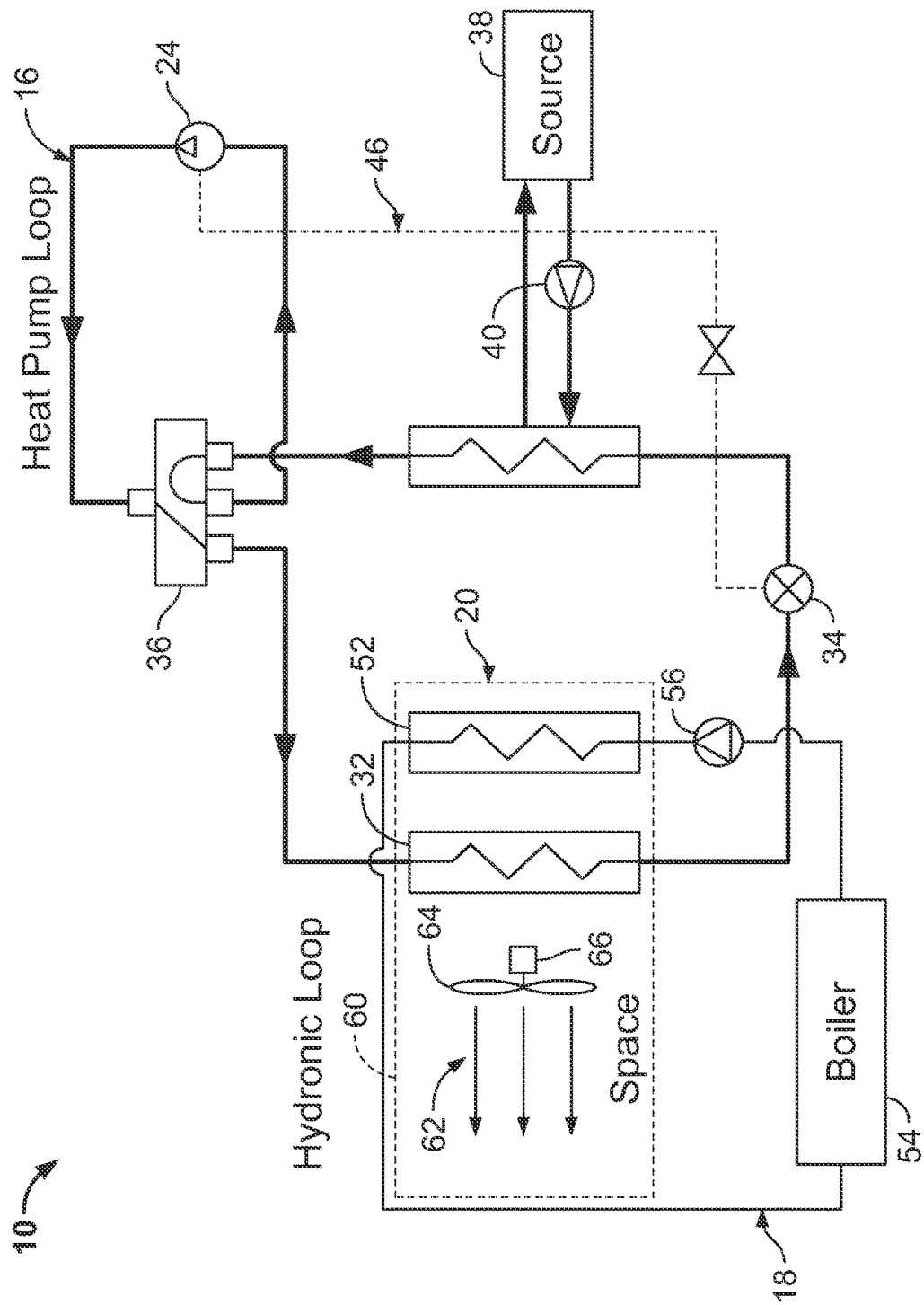
FIG. 5B is a schematic diagram of the hybrid heat pump system with the hydronic heat exchanger positioned upstream of the space heat exchanger relative to airflow. The bolded line illustrates the water flow path in the heat pump loop operating in heating mode.

FIG. 5A illustrates the hybrid heat pump system 10 operating in a space heating mode in which the heat pump loop 16 is functioning alone, and the hydronic loop 18 is inactive. The hot gas bypass 46 may or may not be activated, depending on temperature requirements in the conditioned space. In this embodiment, the hydronic heat exchanger 52 is positioned downstream of the space heat exchanger 32 with respect to the airflow. FIG. 5B depicts a similar solo heating mode of operation for the hybrid heat pump system 10 when the hydronic heat exchanger 52 is positioned upstream of the space heat exchanger 32 with respect to the airflow.

Figure 5C:
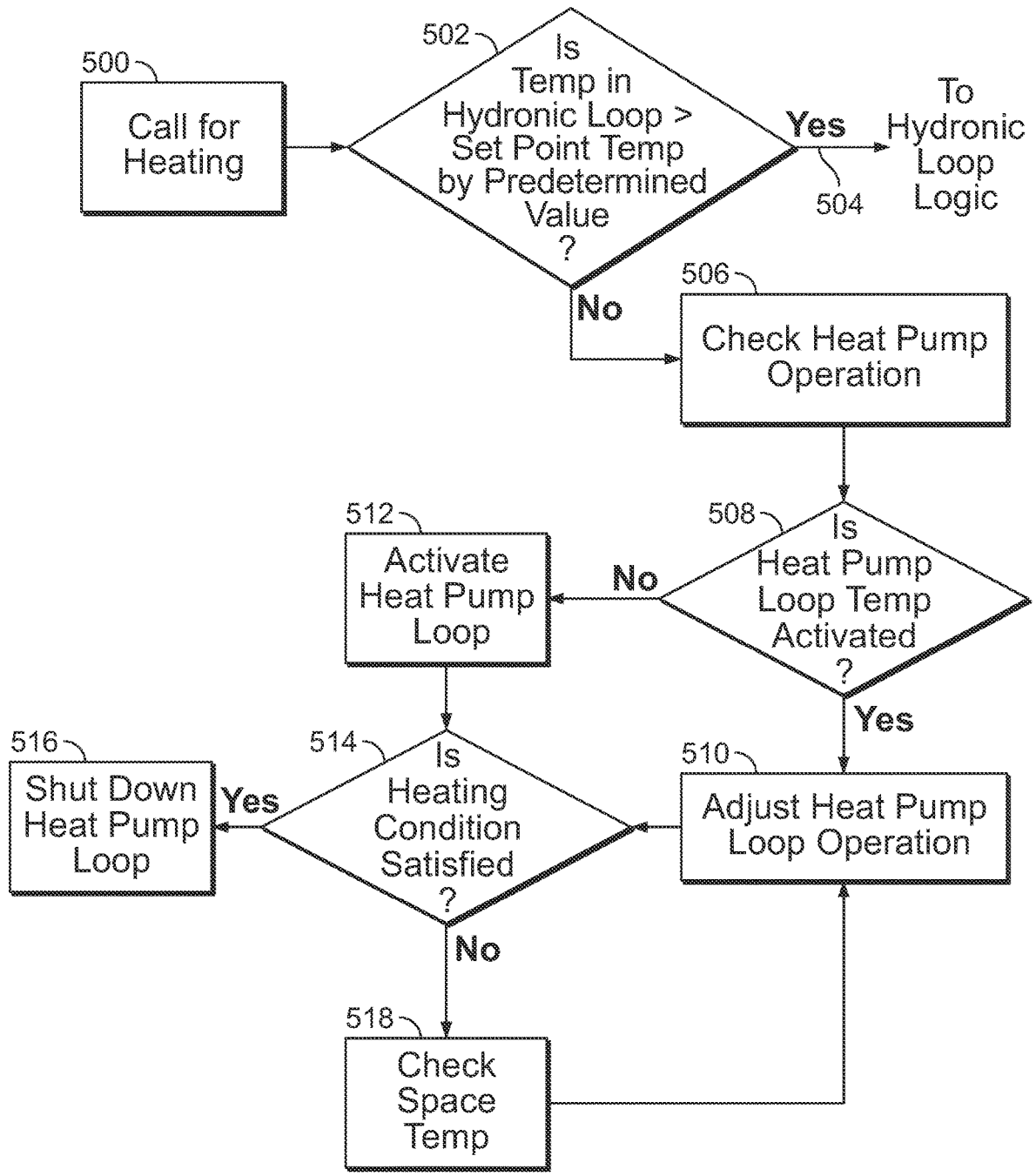
FIG. 5C is a flow chart illustrating the control logic of the hybrid heat pump system when the heat pump loop is operating independently in heating mode, as shown in FIG. 5A.

The control logic for the operation in the heating mode illustrated in FIGS. 5A and 5B is shown in FIG. 5C. The operation commences at 500 with a demand from the conditioned space 12 for heating. Typically, this demand is based on the feedback from a thermostat or temperature sensor (not shown) in the conditioned space 12. At 502, the control system 70 for the hybrid heat pump system 10 verifies whether the hydronic loop 18 can be activated.

If the outcome is positive, based on the hydronic loop temperature (or supply water temperature), the hydronic loop 18 is activated and operated in accordance to the hydronic loop control logic module 504. This occurs if the hydronic loop temperature is higher than the desired set point temperature in the conditioned space 12 by a pre-determined value/threshold (defined for instance by a numeric value, a tabulated set of values, a formula or an algorithm).

In the case of a negative outcome at 502, the heat pump loop 16 operational status is checked at 506. At 508, operation of the heat pump loop 16 is verified. In accordance to the decision fork at 508, if the heat pump loop 16 is active, its operation adjustment may be necessary at 510. If the heat pump loop 16 is inactive, it is activated at 512.

At 514, the temperature in the conditioned space 12 is checked and compared to the desired set point temperature. If the temperature in the conditioned space 12 is lower than the desired set point temperature (within the specified tolerance band), then the control system 70 adjusts operation of the heat pump loop 16 and modulates the heat pump loop components at 510. By way of example, the control system 70 may adjust the speed of the compressor 24, pump 40 and blower 66, as well as control the hot gas bypass valve 48 and expansion device 34 to satisfy the temperature requirements in the conditioned space 12.

If at 514 the temperature in the conditioned space 12 is higher than or equal to the desired set point temperature, the control system 70 deactivates the heat pump loop 16 at 516. The control system 70 continues to check the temperature in the conditioned space 12 at 518 and compare its value to the target temperature at 514.

If the temperature in the conditioned space 12 has not yet reached the target temperature, the control system 70 will modulate operation of the components of the heat pump refrigerant loop 16, to adjust capacity of the heat pump refrigerant loop 16. As mentioned above, when the temperature condition in the conditioned space 12 is satisfied, that is, when the temperature in the conditioned space 12 has reached the target temperature within the specified tolerance band, the heat pump loop 16 is shut down at 516.

Figure 6A:
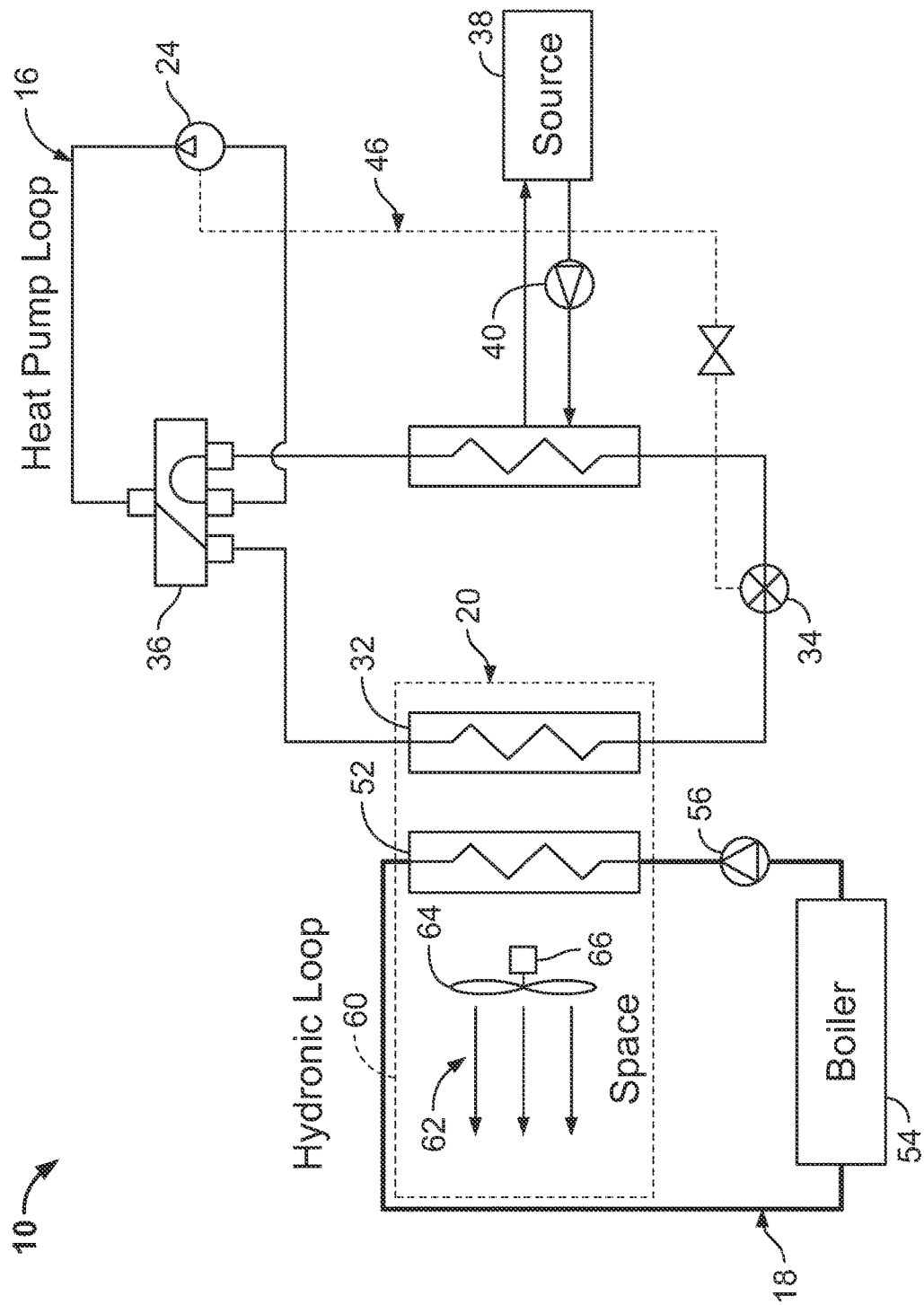
FIG. 6A is a schematic diagram of the hybrid heat pump system of FIG. 1 illustrating the operation of the system in a heating mode in which only the hydronic loop is operating. The bolded line illustrates the water flow path in the hydronic loop operating in heating mode.
Figure 6B:
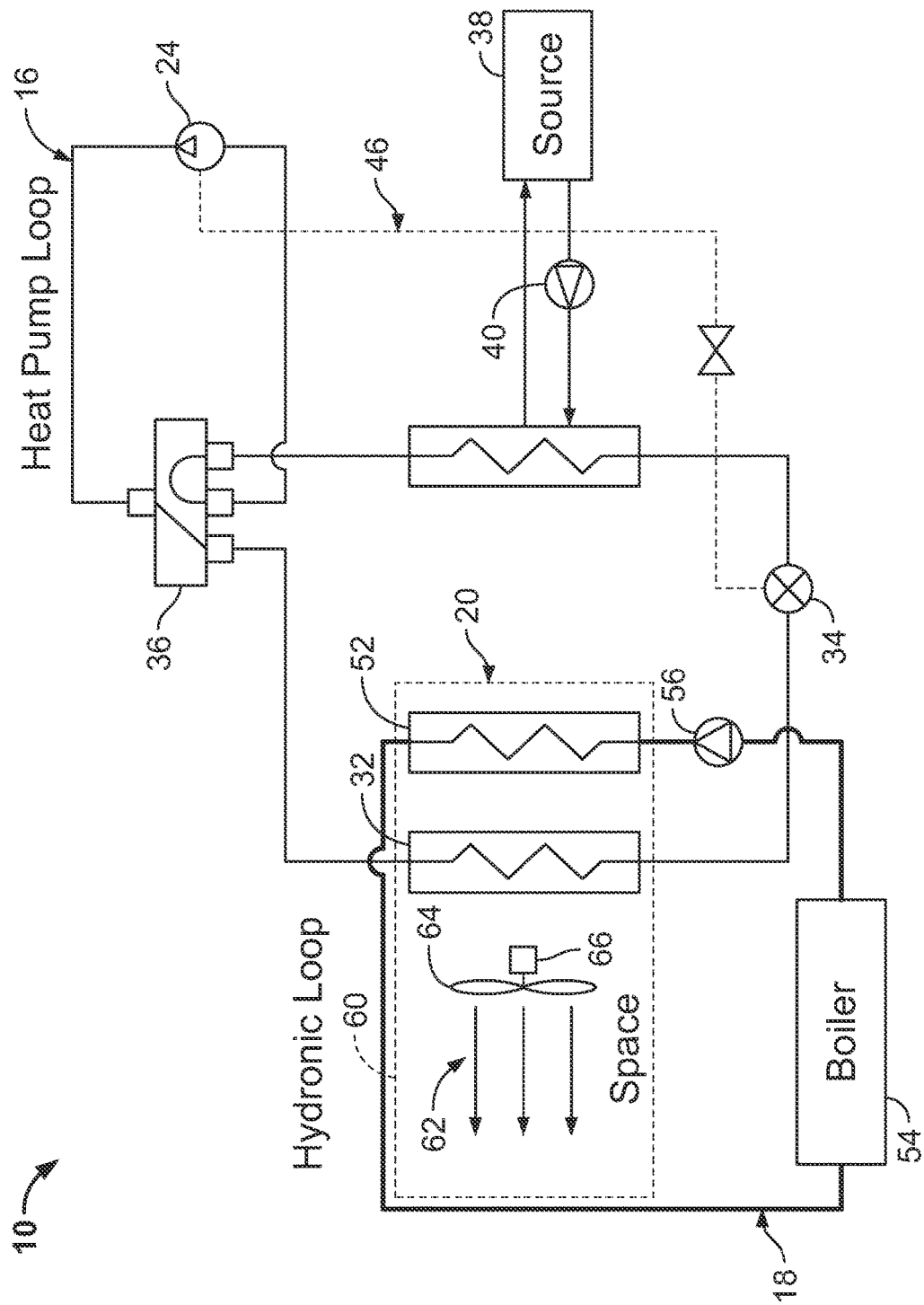
FIG. 6B is a schematic diagram of the hybrid heat pump system with the hydronic heat exchanger positioned upstream of the space heat exchanger relative to airflow. The bolded line illustrates the water flow path in the hydronic loop operating in heating mode.

FIG. 6A illustrates a heating mode in which the hydronic loop 18 is operating independently. The hydronic heat transfer device 54 may be a conventional boiler or other heat source such as intermediate heat exchanger in the cascade system. The hot gas bypass 46 and the heat pump loop 16 of the hybrid heat pump system 10 are inactive. This mode is engaged when the temperature of the hydronic loop 18 is higher than the desired temperature in the conditioned space 12 by a predetermined value. Since the heat pump loop 16 is not activated in this mode of operation, significant power consumption reduction and operational efficiency improvement are realized. In this embodiment, the hydronic heat exchanger 52 is positioned downstream of the space heat exchanger 32 with respect to the airflow. FIG. 6B depicts a similar heating mode of operation for the hybrid heat pump system 10 when the hydronic heat exchanger 52 is positioned upstream of the space heat exchanger 32 with respect to the airflow.

Figure 6C:
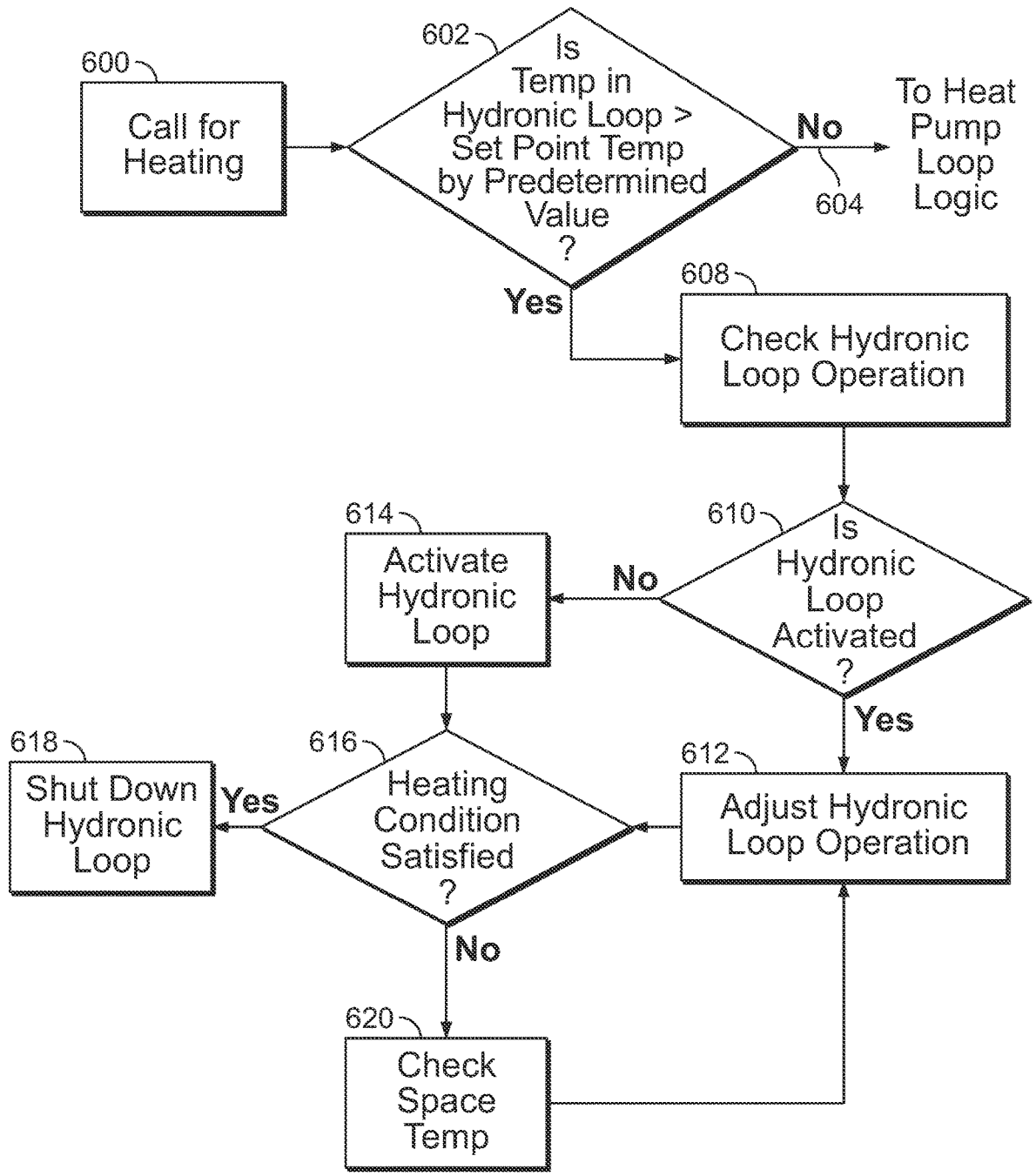
FIG. 6C is a flow chart illustrating the control logic of the hybrid heat pump system when the hydronic loop is operating independently in heating mode, as shown in FIG. 5A.

The control logic for the operation in the heating mode illustrated in FIGS. 6A and 6B is shown in FIG. 6C. The operation commences at 600 with a demand from the conditioned space 12 for heating. Typically, this demand is based on the feedback from a thermostat or temperature sensor (not shown) in the conditioned space 12. At 602, the control system 70 for the hybrid heat pump system 10 verifies whether the hydronic loop 18 can be activated. In the case of a negative outcome, the heat pump loop 16 is activated and operated in accordance to the heat pump loop control logic at 604.

If the outcome at 602 is positive, based on the hydronic loop temperature (or supply water temperature), the hydronic loop 18 is activated at 608. This occurs if the hydronic loop temperature is higher than the desired set point temperature in the conditioned space 12 by a pre-determined value/threshold (defined for instance by a numeric value, a tabulated set of values, a formula or an algorithm). At 610, operation of the hydronic loop 18 is verified. In accordance to the decision fork at 610, if the hydronic loop 18 is active, its operation adjustment may be necessary at 612. If the hydronic loop 18 was inactive, it is activated at 614.

At 616, the temperature in the conditioned space 12 is checked and compared to the desired set point temperature. If the temperature in the conditioned space 12 is lower than the desired set point temperature (within the specified tolerance band), then the control system 70 adjusts operation of the hydronic loop 18 and modulates the heat pump loop components at 612. By way of example, the control system 70 may adjust the speed of the pump 56 and blower 66 to satisfy the temperature requirements in the conditioned space 12. If the temperature in the conditioned space 12 is higher than or equal to the desired set point temperature, the control system 70 deactivates the hydronic loop 18 at 618.

The control system 70 continues to check the temperature in the conditioned space 12 at 620 and compare its value to the target temperature at 612. If the temperature in the conditioned space 12 has not yet reached the target temperature, the control system 70 will modulate operation of the components of the hydronic loop 18, to adjust capacity of the hydronic loop 18. As mentioned above, when the temperature condition in the conditioned space 12 is satisfied, that is, when the temperature in the conditioned space 12 has reached the target temperature (within the specified tolerance band), the hydronic loop 18 is shut down at 618.

The condition at 602 may reference the space temperature instead of the desired set point temperature and the hydronic loop temperature either adjusted or alternate mode of operation (the heat pump loop) is activated when further adjustment in the hydronic loop temperature cannot be made. This may allow maximum utilization of the hydronic loop 18 before the heat pump loop 16 is brought online. Similar modifications can be applied to FIGS. 2C, 3C and 5C.

Figure 7A:
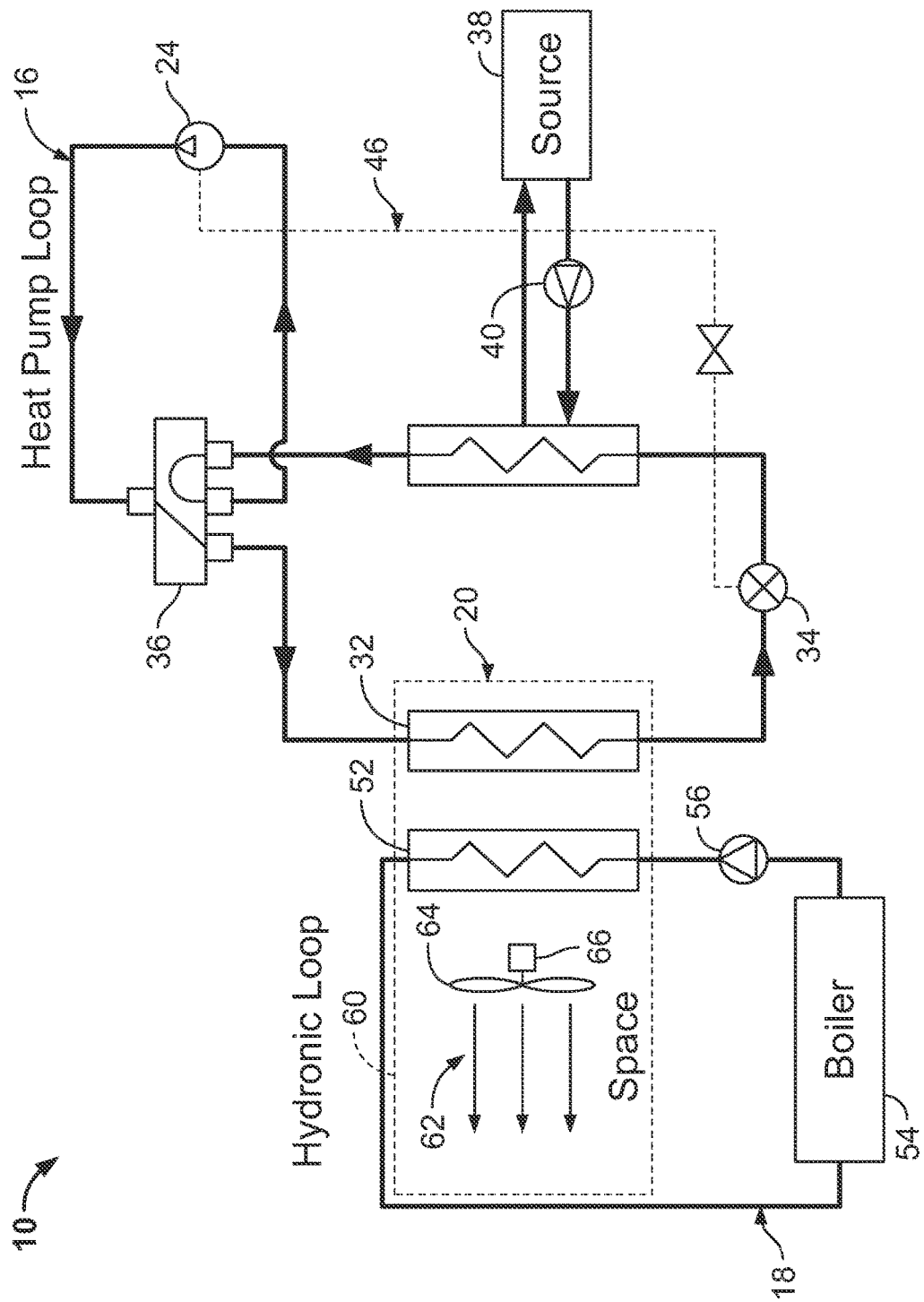
FIG. 7A is a schematic diagram of the hybrid heat pump system of FIG. 1 illustrating the operation of the system in a heating mode in which both the heat pump loop and the hydronic loop are operating. The bolded line illustrates the water flow path in the hydronic loop and the heat pump loop both operating in heating mode.

FIG. 7A illustrates the hybrid heat pump system 10 operating in an integral heating mode in which the heat pump loop 16 and the hydronic loop 18 are operating together. As described above, the water temperature in the hydronic loop 18 must be higher than the desired set point temperature in the conditioned space 12. The hot gas bypass 46 may be activated to trim the capacity of the heat pump loop 16. This mode of operation provides additional heating from the heat pump loop 16 when the heating provided by the hydronic loop 18 alone is inadequate.

The operational engagement of the heat pump loop 16 may be minimal, allowing for the input power reduction, energy savings, reduced noise, and improved overall reliability for the hybrid heat pump system 10. Additionally, the air temperature downstream of the space heat exchanger 32 must be lower than the water (or brine) temperature supplied to the hydronic heat exchanger 52 by a pre-determined value and must be monitored and controlled, for instance by adjusting performance of the boiler 54 or modulating capacity of the heat pump loop 16. In this embodiment, the hydronic heat exchanger 52 is positioned downstream of the space heat exchanger 32 with respect to the airflow.

Figure 7B:
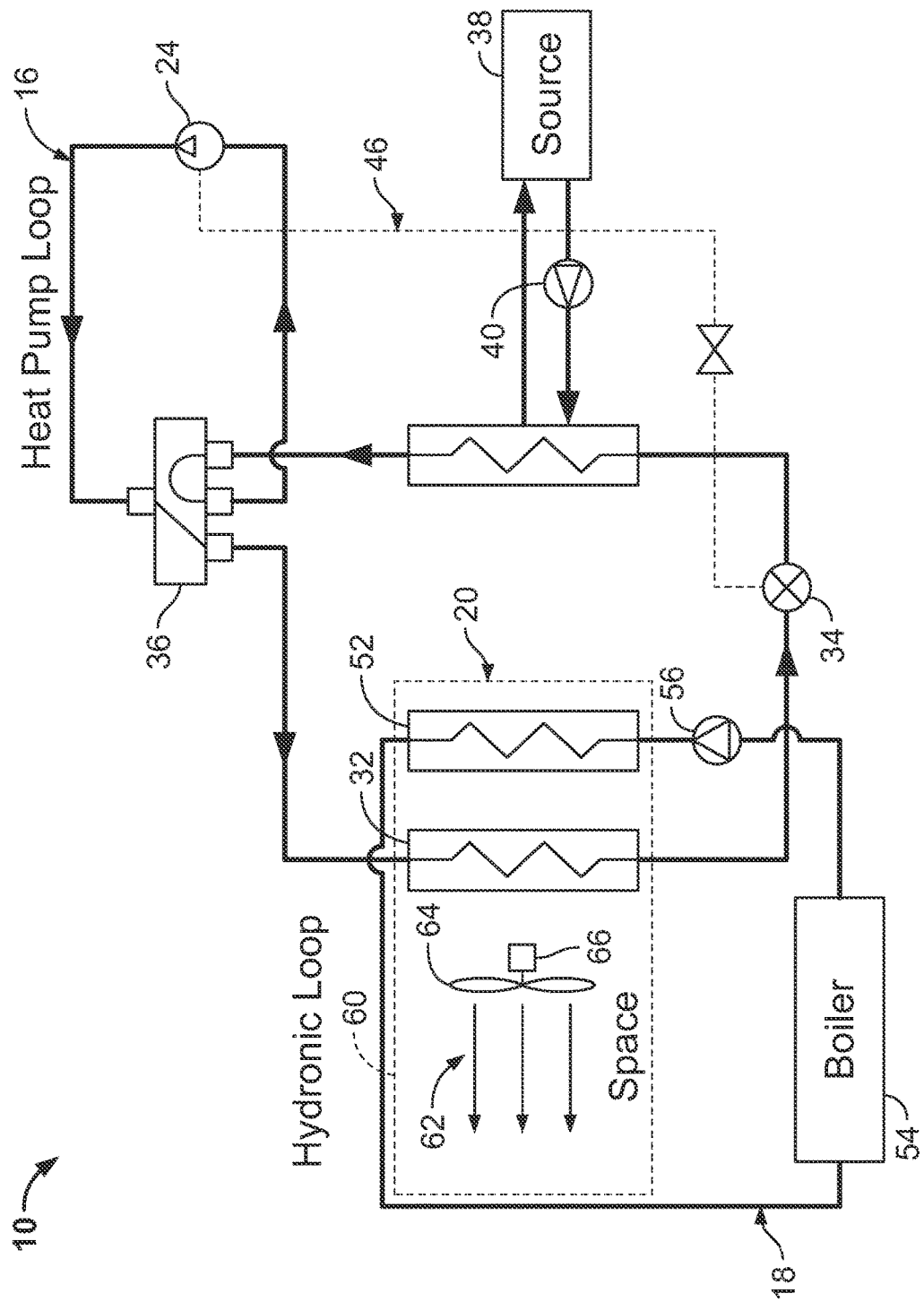
FIG. 7B is a schematic diagram of the hybrid heat pump system with the hydronic heat exchanger positioned upstream of the space heat exchanger relative to airflow. The bolded line illustrates the water flow path in the hydronic loop and the heat pump loop both operating in heating mode.

FIG. 7B depicts a similar heating mode of operation for the hybrid heat pump system 10 when the hydronic heat exchanger 52 is positioned upstream of the space heat exchanger 32 with respect to the airflow. Such system configuration may provide more flexibility in this integral cooling mode of operation, since it is not limited by the air temperature leaving the space heat exchanger 32, and allows for a wide operational envelope and less complex system capacity control. However, in this system configuration, the reheat option cannot be integrated into the design of the heat pump system 10 by utilizing the same hydronic heat exchanger 52.

Figure 7C:
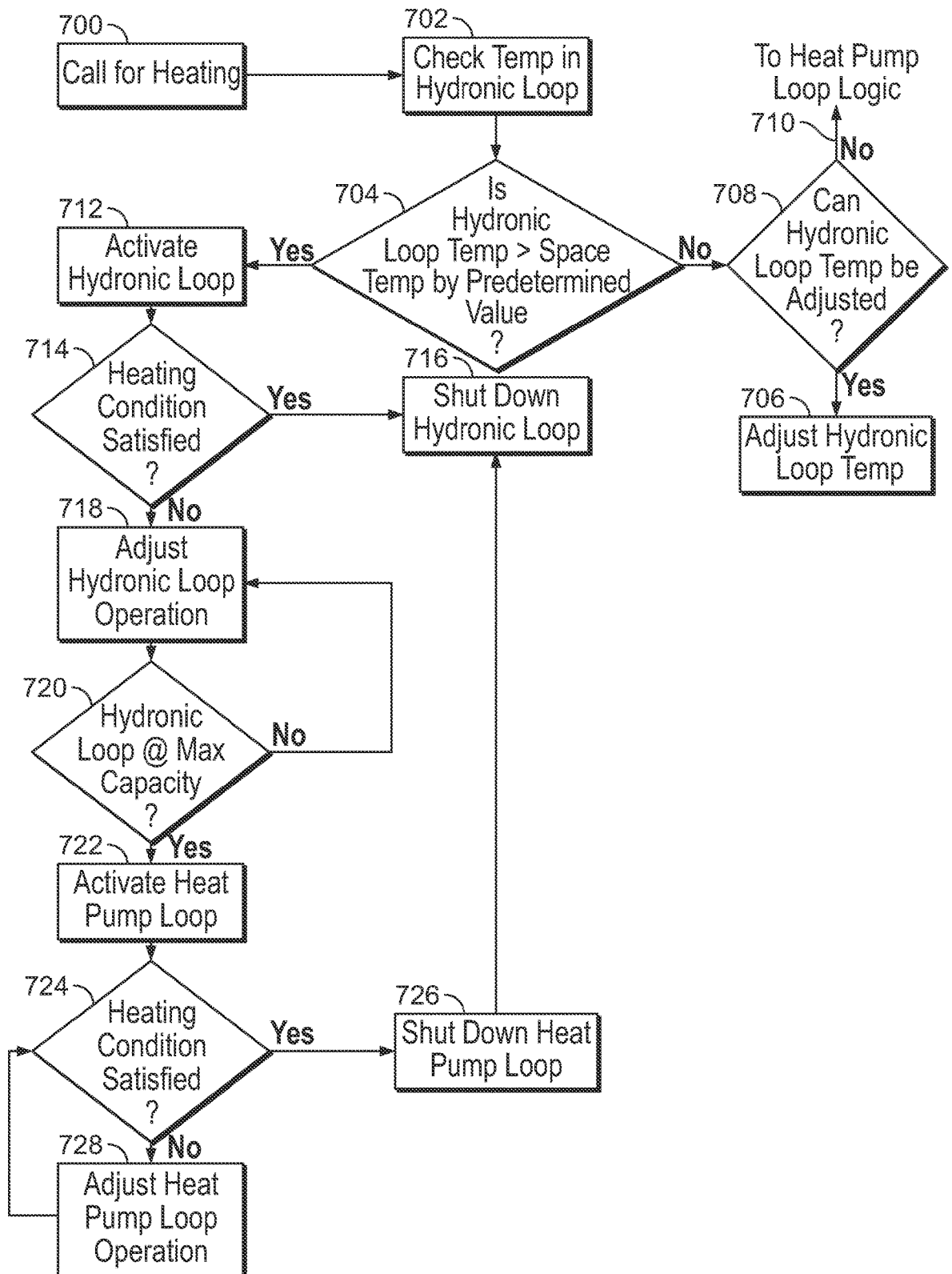
FIG. 7C is a flow chart illustrating the control logic of the hybrid heat pump system when the hydronic loop and the heat pump loop are operating integrally in heating mode, as shown in FIG. 7A.

The control logic for the operation in the integrated heating mode illustrated in FIGS. 7A and 7B is shown in FIG. 7C. For simplification purposes, the activation control logic for the heat pump loop 16 and hydronic loop 18, as well as a step for the temperature check in the conditioned space 12 are omitted and may be found in FIGS. 5C and 6C. On the other hand, the control logic for the temperature adjustment in the hydronic loop 18 can be found in FIG. 7C and extended to FIGS. 5C and 6C.

The operation commences at 700 with a demand from the conditioned space 12 for heating. Typically, this demand is based on feedback from a thermostat or temperature sensor (not shown) in the conditioned space 12. At 702, the temperature in the hydronic loop 18 (or supply water temperature) is checked. At 704, the temperature in the hydronic loop 18 is compared to the temperature in the conditioned space 12. If the temperature in the hydronic loop 18 is lower than or equal to the temperature in the conditioned space 12, then operation of the hydronic loop 18 is adjusted at 706, if such adjustment is possible as prescribed at 708. By way of example, the airflow for the boiler 54 or speed for the hydronic pump 56 may be adjusted. If the adjustment of operation for the hydronic loop 18 is not possible, then the control logic for the heat pump loop 16 is activated at 710.

If the temperature in the hydronic loop 18 is higher than the temperature in the conditioned space 12 by a predetermined value/threshold (defined for instance by a numeric value, a tabulated set of values, a formula or an algorithm), then the hydronic loop 18 is activated at 712. At 714 the system control 70 continues to check the temperature in the conditioned space 12 and compare it to the target temperature. If the temperature in the conditioned space 12 has reached the target temperature (within the specified tolerance band), the hydronic loop 18 is shut down at 716. If the temperature in the conditioned space 12 has not reached the target temperature, operation of the hydronic loop 18 is adjusted at 718 (as described previously).

At 720, the control system 70 continues to monitor the status of the hydronic loop 18 to determine if it is operating at its maximum heating capacity. If this is not the case, further adjustment to hydronic loop operation may be made at 718 to achieve higher heating capacity. If the input at 720 reports that the hydronic loop 18 has reached its maximum heating capacity, then the heat pump loop 16 is activated at 722 to assist the hydronic loop 18 and provide supplemental heating.

The system control 70 continues to check the temperature in the conditioned space 12 and compare it to the target temperature at 724. If the temperature in the conditioned space 12 has reached the target temperature, the heat pump loop 16 is shut down at 726 and then the hydronic loop 18 is shut down at 716. The system control 70 continues to make adjustments to the heat pump loop 16 at 728 until the heating condition at 720 is satisfied.

The control logic for the integrated heating mode can be reversed with the heat pump loop 16 providing a primary source of heating and the hydronic loop 18 providing supplementary cooling. Such control logic/sequence may be useful for capacity adjustment and performance trimming to provide precise temperature control and minimize discomfort for the occupant of the conditioned space 12 due to temperature variations. Also, the performance adjustment can be a continuous modulation or stepwise discrete staging of operation for both heat pump loop 16 and hydronic loop 18. Furthermore, the control logic for safe and reliable operation, as related to the hydronic loop temperature mentioned above, are omitted for clarity and simplicity. Lastly, the condition at 702 may reference the desired set point temperature instead of the space temperature. Similar modifications can be made to the control logic in FIG. 4C at 402.

Figure 8A:
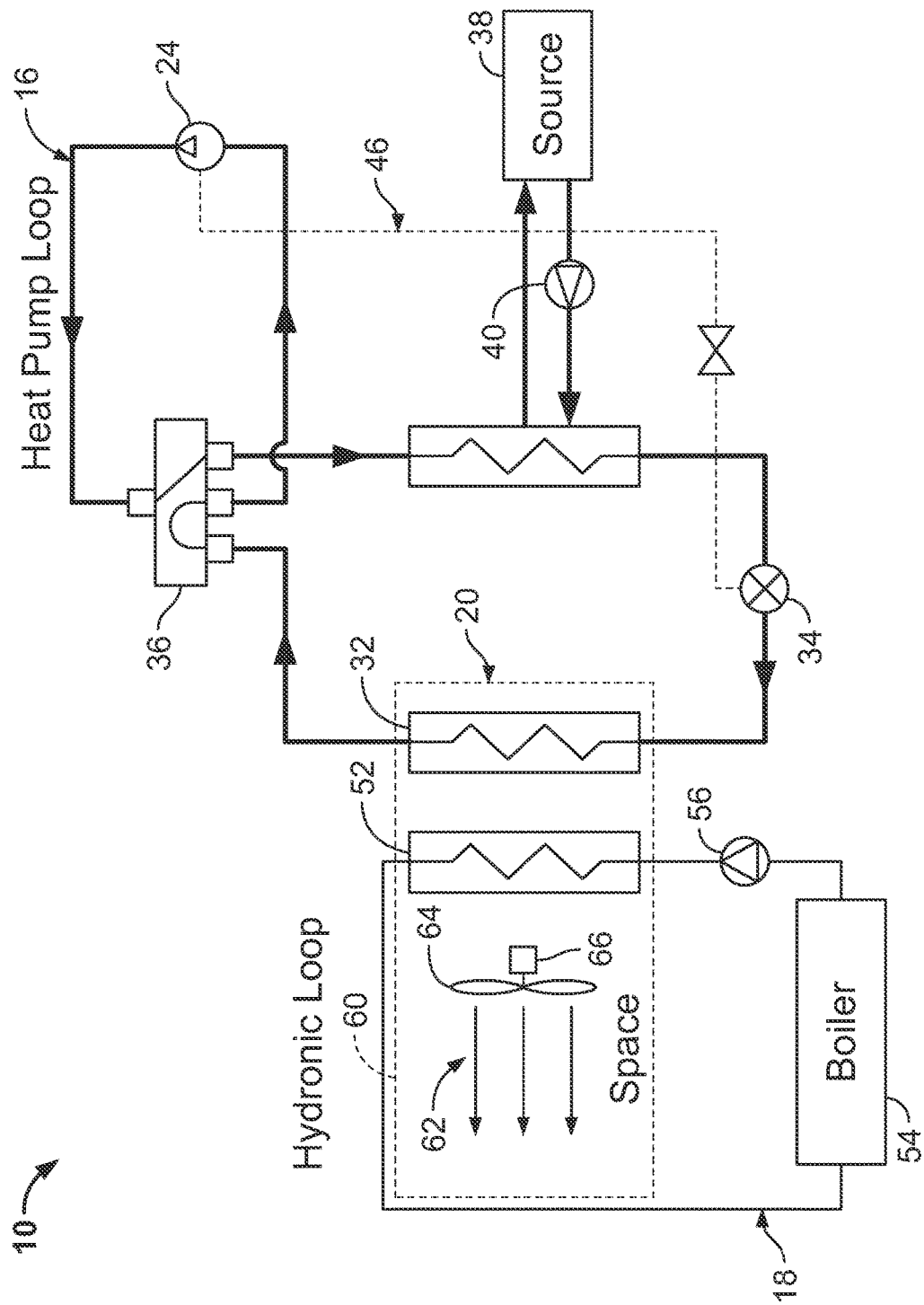
FIG. 8A is a schematic diagram of the hybrid heat pump system of FIG. 1 illustrating the operation of the system in a cooling mode in which the heat pump loop is cooling and the hydronic loop is operating in reheat mode.

FIG. 8A illustrates the hybrid heat pump system 10 using the heat pump loop 16 operating in the space cooling mode with the hydronic loop 18 providing a reheat function. In this mode, it is necessary that the hydronic heat exchanger 52 be positioned downstream of the space heat exchanger 32. The amount of the provided reheat may be adjusted by controlling various components within the heat pump loop 16 and the hydronic loop 18. Therefore, the amount of cooling and dehumidification can be controlled independently and over a wide range of operating conditions. Other advantages of such reheat system design include reduced refrigerant charge amount (that is extremely important in connection to the HVAC&R industry conversion to the flammable low GWP refrigerants and phase-out of HFCs), minimal susceptibility to the refrigerant charge migration, relatively low complexity level in the control logic for the system controls 70, and improved overall reliability of the hybrid heat pump system 10.

Figure 8B:
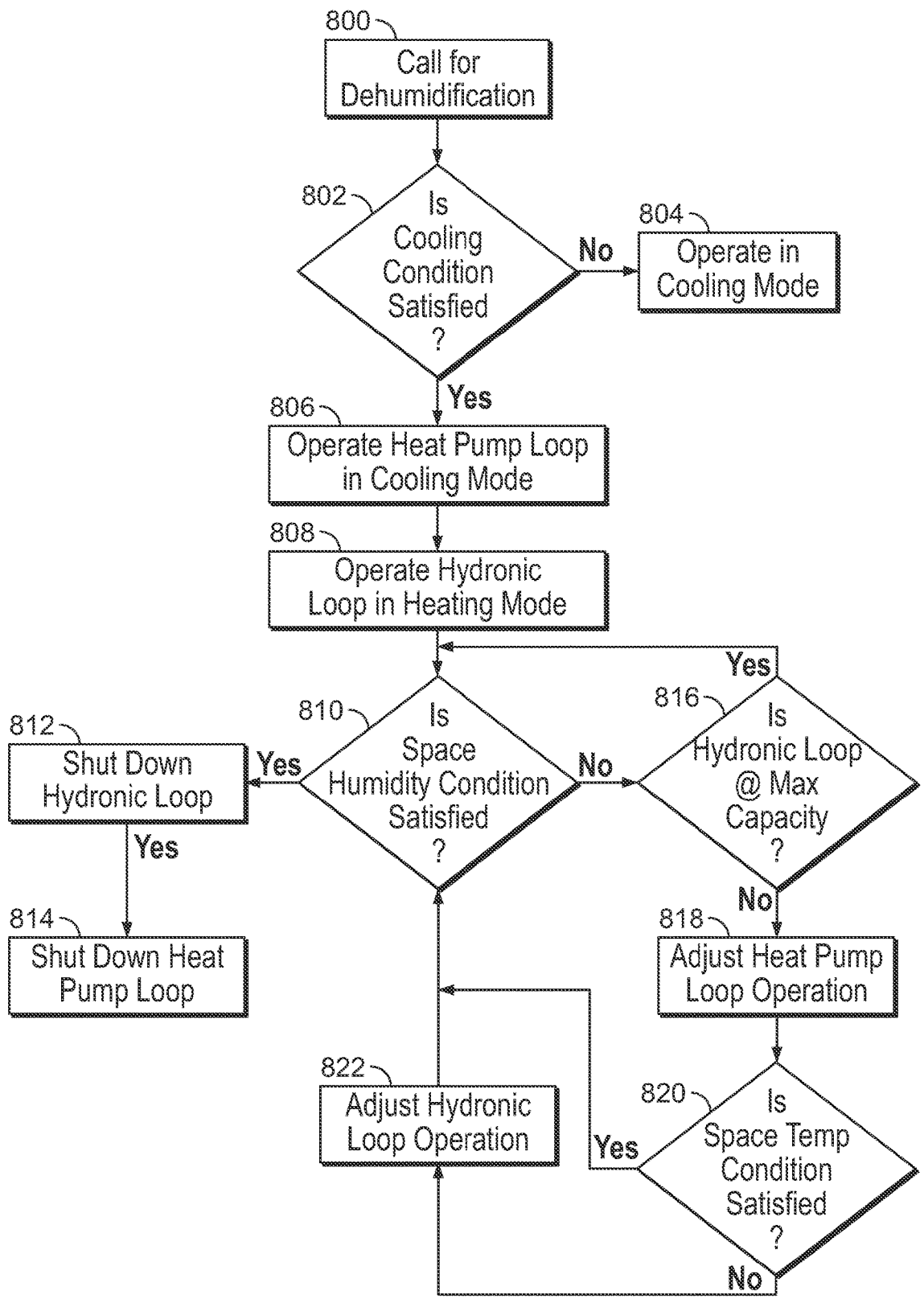
FIG. 8B is a flow chart illustrating the control logic of the hybrid heat pump system when the hydronic the heat pump loop is cooling and the hydronic loop is operating in reheat mode, as shown in FIG. 8A.

The control logic for the operation of the reheat mode illustrated in FIG. 8A is shown in FIG. 8B. The operation commences at 800 with a demand from the conditioned space 12 for dehumidification. At 802, the cooling demand in the conditioned space 12 is checked. If there still a demand for cooling in the conditioned space 12, it takes priority over dehumidification, and the system control 70 operates the hybrid heat pump system 10 in one of the cooling modes (heat pump loop cooling mode, hydronic loop cooling mode or integral heat pump loop/hydronic loop cooling mode) at 804, typically based on the highest operational efficiency as well as safe and reliable operating conditions. These three modes of operation have been described in previous embodiments.

If the cooling demand in the conditioned space 12 is satisfied, then the system control 70 operates the hybrid heat pump system 10 in the dehumidification mode, that is, the heat pump loop 16 is operated in the cooling mode as shown at 806, and the hydronic loop 18 is operated in the heating mode at 808. At 810, the humidity value in the conditioned space 12 is verified, and if the targeted humidity level is satisfied, the hydronic loop 18 and the heat pump loop 16 are shut down at 812 and 814, respectively.

On the other hand, if the targeted humidity level in the conditioned space 12 is not reached at 810, then the hydronic loop 18 is checked for operation at its maximum capacity threshold at 816. If the resulting outcome is positive, the control logic loops back to 810 to continuously assess the humidity level in the conditioned space 12, until the desired targeted humidity level is achieved or another higher priority call is registered. In case the hydronic loop 18 is found of not operating at its maximum capacity at 816, the adjustments in operation of the heat pump loop 16 are made at 818 to improve the dehumidification (and therefore cooling) capability of the hybrid heat pump system 10.

Consequently, the temperature in the conditioned space 12 must be re-examined at 820. If the temperature in the conditioned space 12 did not drop (or not about to drop) below the desired level, the system control 70 simply loops back to 810 where the humidity condition is monitored and checked on a continuous basis. In case corrections in the temperature of the air delivered to the conditioned space 12 are required, the system control 70 adjusts the performance of the hydronic loop 18 at 822 to enhance the reheat function and to bring the temperature of the air delivered to the conditioned space 12 to the targeted level (in other words, to be in a lockstep with the heat pump loop adjustments made at 812). The adjustments made at 818 and 822 in operation of the heat pump loop 16 in the cooling mode and the hydronic loop 18 in the heating mode, respectively, their respective components are modulated as disclosed above in the respective embodiments.

Although dehumidification mode of operation typically assumes neutral target temperature in the conditioned space, additional cooling or heating requirements may be imposed on the hybrid heat pump system 10. Such requirements can be satisfied in a more precise and flexible manner than with the conventional hot gas reheat system approach, since the temperature and humidity in the conditioned space are controlled by the two independent loops, that is the heat pump loop 16 and the hydronic loop 18. In these cases, the control logic still follows in principle the flowchart depicted in FIG. 8B.

Figure 9:
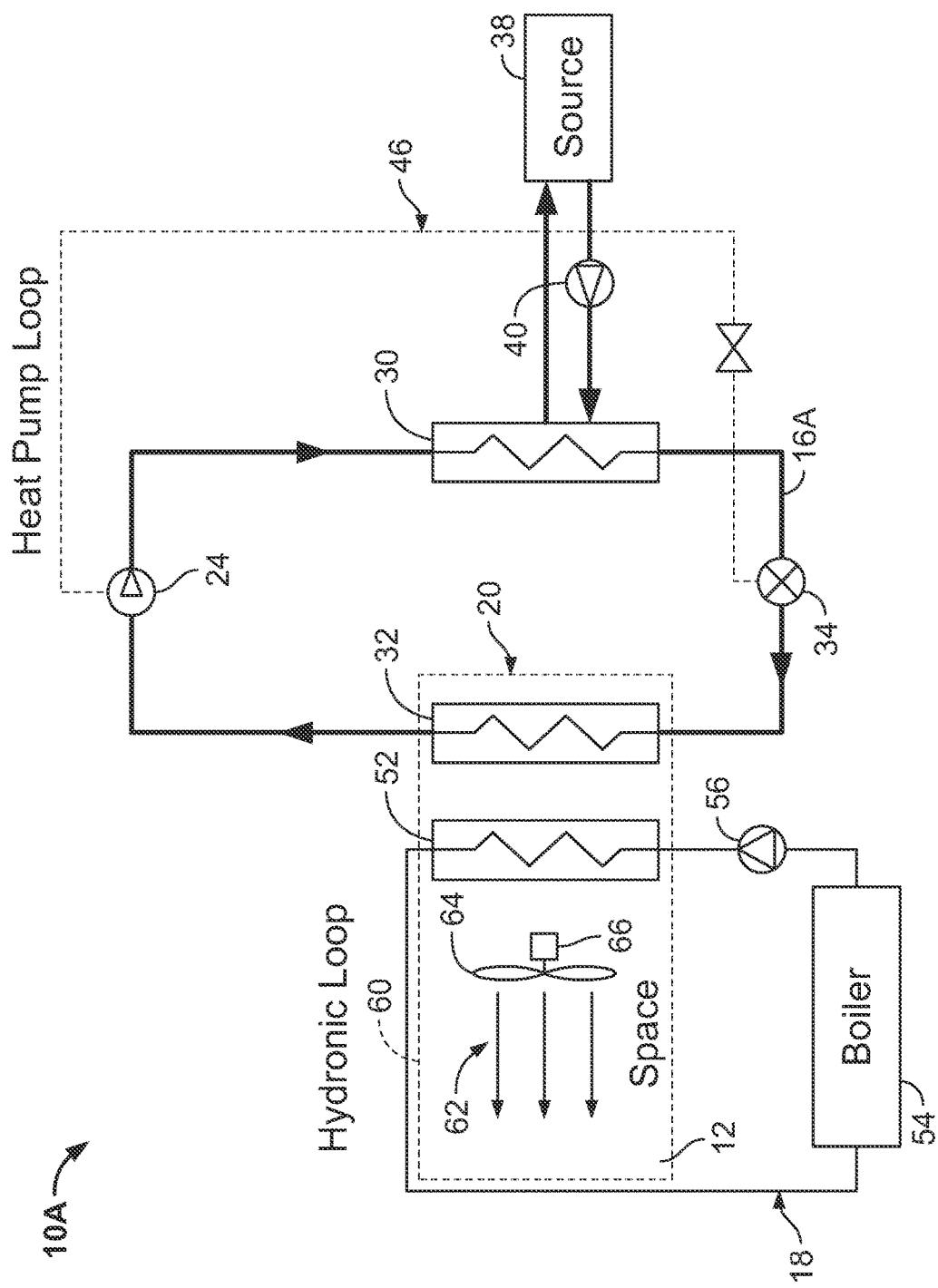
FIG. 9 shows a simplified embodiment of the hybrid heat pump system in which the heat pump loop operates solely in the cooling mode and the reversing valve is omitted.

In accordance with another embodiment of the invention, shown in FIG. 9 and designated generally at 10A, the hybrid heat pump system may be simplified to a design where the cooling function is provided by the heat pump loop 16A and the heating function is supplied by the hydronic loop 18. In this case, the reversing valve 36 of the embodiment of FIG. 1 is not required. The hydronic loop 18 still can be utilized for the sole cooling, integral cooling, and reheat/dehumidification operation, as described above, if relevant hydronic loop control means and control logic are employed.

In yet another embodiment, the hydronic heat exchanger 52 of the hydronic loop 18 can have a separate connection to the water source 38 or can be integrated into the hydronic loop of the source heat exchanger 30. In the former case, if a boiler and a cooling tower (not shown) are connected to the same loop, the switching between hydronic cooling and hydronic heating, executed either as a solo or in conjunction with the heat pump loop 16, is provided externally. Alternatively, if a boiler and a cooling tower, each with a separate heating and cooling loop, respectively, a 3-way valve, or a pair of conventional valves located internally or externally in relation to the unit cabinet is provided to switch between those loops.

Figure 10:
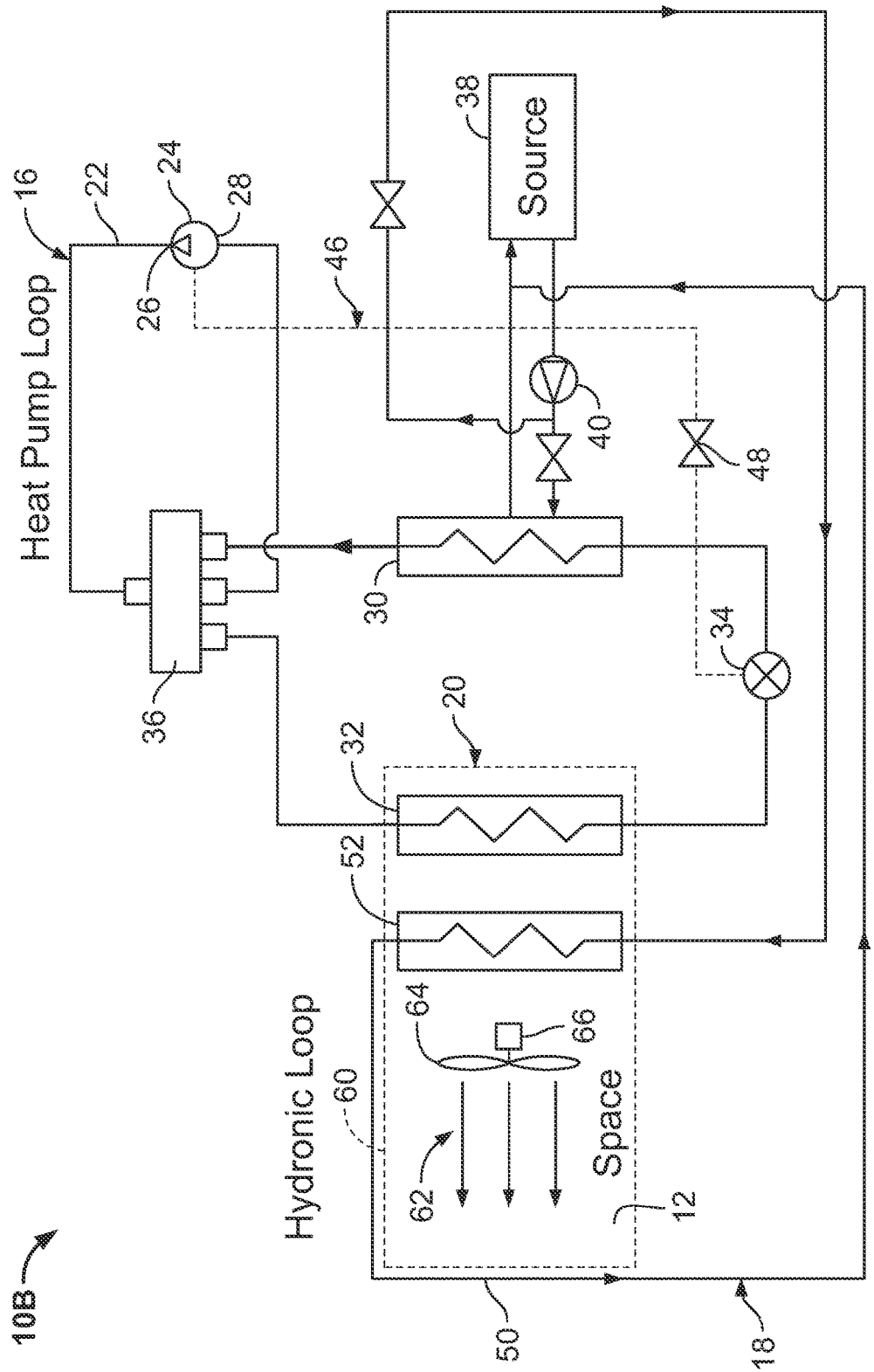
FIG. 10 illustrates a hybrid heat pump system in which the heat exchanger of the hydronic loop is integrated into the hydronic loop of the source heat exchanger, and the hydronic heat exchanger and the source heat exchanger are connected in a parallel arrangement with respect to the water flow.

Furthermore, when the hydronic heat exchanger 52 and the source heat exchanger 30 are integrated into the same loop, they can be interconnected in a sequential or parallel arrangement with respect to the water flow. In the parallel configuration depicted in shown in FIG. 10 and designated generally at 10B, the operation of the hybrid heat pump system 10 is similar to that described above, and the advantage of the lower water-side hydraulic resistance may be realized via a reduced water pump power consumption and potentially wider operational envelope.

Figure 11:
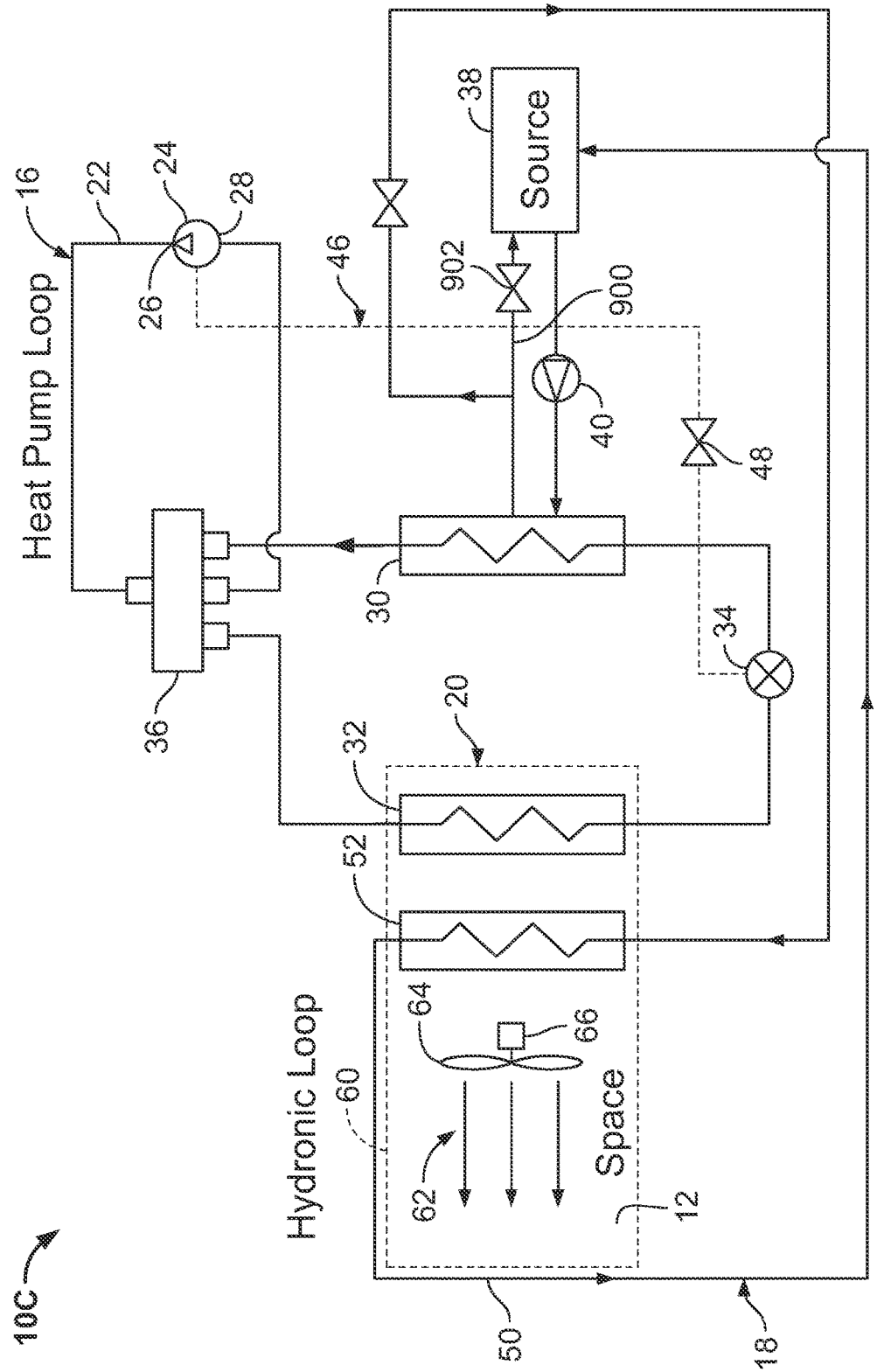
FIG. 11 illustrates a hybrid heat pump system in which the heat exchanger of the hydronic loop is integrated into the hydronic loop of the source heat exchanger, and the hydronic heat exchanger and the source heat exchanger are connected in a sequential arrangement with respect to the water flow.

In the sequential configuration depicted in shown in FIG. 11 and designated generally at 10C, the hydronic heat exchanger 52 may be placed upstream or downstream of the source heat exchanger 30 with respect to the water flow. However, if an improved heating/dehumidification function by the hydronic heat/reheat is desired, the downstream location of the hydronic heat exchanger 52 shown in FIG. 11 is preferable. This system configuration is more beneficial since the heat rejected to the water stream in the source heat exchanger 30 may be used in addition to the heat provided by an external source. Also, the hydronic bypass loop 900 with the bypass valve 902 is provided for better control and more consistent operation. Moreover, the performance adjustment or control means can be provided by a modulation, PWM, or ON/OFF cycling flow control devices such as valves, potentially in combination with a variable speed pump, to regulate the amount of reheat and therefore precisely control temperature and humidity in the conditioned space.

Figure 12:
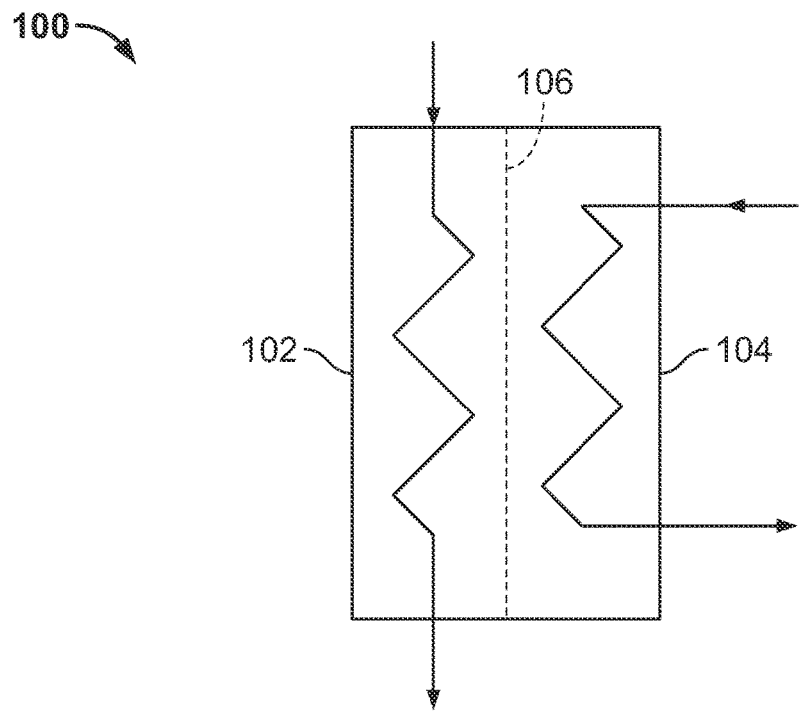
FIG. 12 is a schematic diagram of two heat exchangers, one operating as the hydronic heat exchanger and one operating as the space heat exchanger for the heat pump loop. The two heat exchangers are configured as a single slab with a slit fin.

In one preferred embodiment of the present invention, the hydronic heat exchanger 52 and the space heat exchanger 32 for the hybrid heat pump system 10 may be configured conveniently as a single slab construction. In the embodiment shown in FIG. 12, the heat exchanger unit 100 comprises a first heat exchanger 102 and a second heat exchanger 104 with the slit fin 106 in between to prevent cross-conduction and to provide an adequate level of freeze protection. The unit 100 may be installed so that the first heat exchanger 102 serves as the hydronic heat exchanger for the hydronic loop 18 and the second heat exchanger 104 serves as the space heat exchanger for the heat pump loop 16. As before, in most instances, it may be preferable for the unit 100 to be oriented so that the hydronic heat exchanger is positioned downstream in the airflow path, so that the hydronic loop 18 can selectively operate in the reheat mode.

Figure 13:
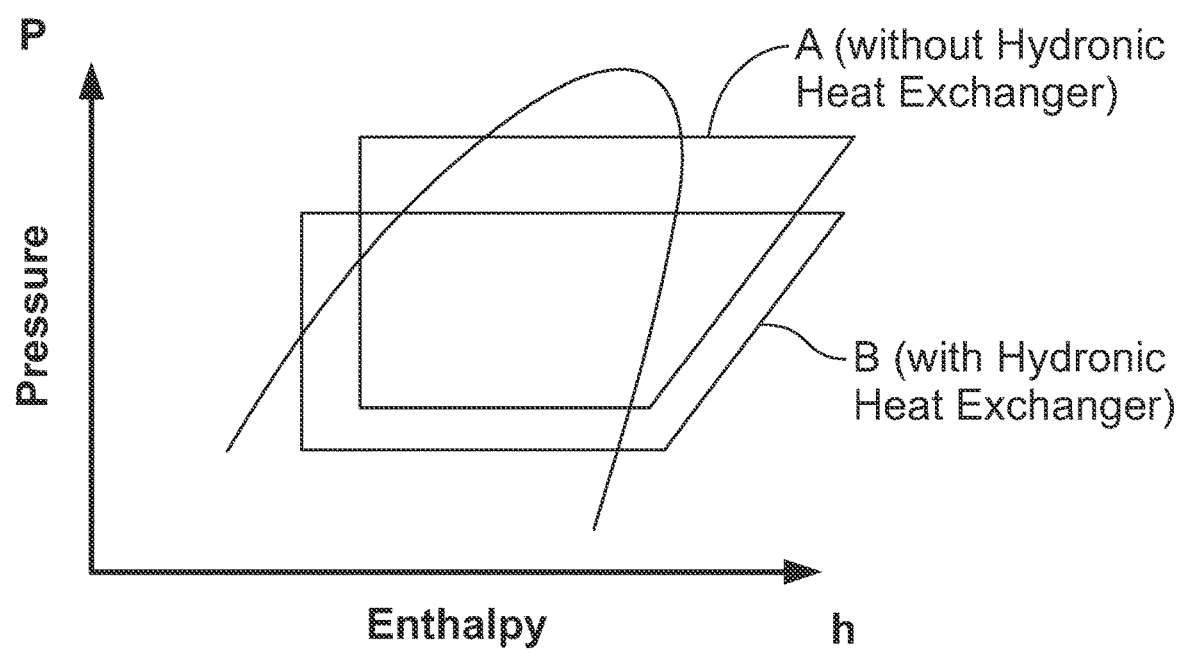
FIG. 13 shows the refrigerant cycles of the system of the present invention graphed onto a P-h (pressure-enthalpy) chart. The cycle designated as "A" illustrates the refrigerant cycle operating without the hydronic heat exchanger and the cycle designated as "B" illustrates the refrigerant cycle operating with the hydronic heat exchanger.

Now it will be apparent that the hybrid heat pump system 10 of the present invention offers many advantages and benefits. By way of example, as depicted in the P-h diagram of FIG. 13 when the hydronic heat exchanger 52 operates in conjunction with the heat pump loop 16, the system efficiency is enhanced, compressor power is reduced, and dehumidification capability is improved. The cycle designated as "A" illustrates the refrigerant cycle operating without the hydronic heat exchanger, and the cycle designated as "B" illustrates the refrigerant cycle operating with the hydronic heat exchanger. The inventive system provides augmented performance and control, as well as offers reduced cost, improved operational flexibility, and enhanced reliability. Still further, especially due to the enhanced dehumidification provided by the reheat function, occupant's comfort level is improved.

The embodiments shown and described above are exemplary. Many details are often found in the art and, therefore, many such details are neither shown nor described herein. It is not claimed that all the details, parts, elements, or steps described and shown were invented herein. Even though numerous characteristics and advantages of the present inventions have been described in the drawings and accompanying text, the description is illustrative only. Changes may be made in the details, especially in matters of shape, size, and arrangement of the parts within the principles of the inventions to the full extent indicated by the broad meaning of the terms of the attached claims. The description and drawings of the specific embodiments herein do not point out what an infringement of this patent would be, but rather provide an example of how to use and make the invention. Likewise, the abstract is neither intended to define the invention, which is measured by the claims, nor is it intended to be limiting as to the scope of the invention in any way. Rather, the limits of the invention and the bounds of the patent protection are measured by and defined in the following claims.

What is claimed is:

1. A hybrid heat pump system for conditioning air in a space, the hybrid heat pump system comprising:
   a heat pump loop comprising:
      a compressor having a discharge outlet and a suction port;
      a source heat exchanger;
      a space heat exchanger;
      an expansion valve positioned between the space heat exchanger and the source heat exchanger;
      a reversing valve positioned downstream of the discharge outlet and configured to:
      direct refrigerant alternately to the source heat exchanger or the space heat exchanger from the discharge outlet; and
      return the refrigerant to the suction port from the other of the source heat exchanger and the space heat exchanger;
   a hydronic loop comprising a hydronic heat exchanger;
   a blower configured to direct air along an air flow path to provide conditioned air to the space, wherein the hydronic heat exchanger and the space heat exchanger are positioned in series along the air flow path; and
   a control system configured to selectively operate the heat pump loop and the hydronic loop in a plurality of operating modes,
   wherein, in combined operating modes of the plurality of operating modes in which the hydronic loop and the heat pump loop operate in combination, the control system is configured to activate the hydronic loop before the heat pump loop for increased utilization of the hydronic loop.

2. The hybrid heat pump system of claim 1, wherein the reversing valve includes a first port positioned downstream of the discharge outlet of the compressor, a second port positioned upstream of the suction port of the compressor, a third port fluidly connected to the source heat exchanger, and a fourth port fluidly connected to the space heat exchanger.

3. The hybrid heat pump system of claim 1, wherein the heat pump loop further comprises a hot gas bypass for selective operation to control capacity of the heat pump loop, wherein the hot gas bypass comprises a first end is connected to a discharge side of the compressor and
   a second end connected to the expansion valve.

4. The hybrid heat pump system of claim 1, wherein the hydronic loop comprises a cooling tower positioned in serial arrangement with the hydronic heat exchanger with respect to water flow through the hydronic loop.

5. The hybrid heat pump system of claim 1, wherein the hydronic loop comprises a boiler positioned in serial arrangement with the hydronic heat exchanger with respect to water flow through the hydronic loop.

6. The hybrid heat pump system of claim 1, wherein the combined operating modes of the plurality of operating modes includes:
   a combined heat pump loop and hydronic loop cooling mode during which the hydronic loop and the heat pump loop are active to cool the space; and
   a combined heat pump loop and hydronic loop heating mode during which the hydronic loop and the heat pump loop are active to heat the space.

7. The hybrid heat pump system of claim 1, wherein the plurality of operating modes includes:
   a heat pump loop cooling mode during which the heat pump loop is active to cool the space and the hydronic loop is inactive; and
   a heat pump loop heating mode during which the heat pump loop is active to heat the space and the hydronic loop is inactive.

8. The hybrid heat pump system of claim 7, wherein, in the heat pump loop cooling mode, the reversing valve is configured to direct the refrigerant from the discharge outlet of the compressor to the source heat exchanger and return the refrigerant from the space heat exchanger to the suction port of the compressor.

9. The hybrid heat pump system of claim 7, wherein, in the heat pump loop heating mode, the reversing valve is configured to direct the refrigerant from the discharge outlet of the compressor to the space heat exchanger and return the refrigerant from the source heat exchanger to the suction port of the compressor.

10. The hybrid heat pump system of claim 1, wherein the plurality of operating modes includes:
    a hydronic loop cooling mode during which the hydronic loop is active to cool the space and the heat pump loop is inactive,
    a hydronic loop heating mode during which the hydronic loop is active to heat the space and the heat pump loop is inactive.

11. The hybrid heat pump system of claim 1, wherein the plurality of operating modes includes a dehumidification mode, wherein the control system is configured to cause the reversing valve to direct the refrigerant from the discharge outlet of the compressor to the source heat exchanger and return the refrigerant from the space heat exchanger to the suction port of the compressor for the dehumidification mode.

* * * * *